US007417645B2

(12) United States Patent
Beda et al.

(10) Patent No.: US 7,417,645 B2
(45) Date of Patent: Aug. 26, 2008

(54) MARKUP LANGUAGE AND OBJECT MODEL FOR VECTOR GRAPHICS

(75) Inventors: Joseph S. Beda, Seattle, WA (US);
Kevin T. Gallo, Woodinville, WA (US);
Adam M. Smith, Kirkland, WA (US);
Gilman K. Wong, Redmond, WA (US);
Sriram Subramanian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/693,633

(22) Filed: Oct. 23, 2003

(65) Prior Publication Data

US 2004/0194020 A1    Sep. 30, 2004

Related U.S. Application Data

(63) Continuation-in-part of application No. 10/401,717, filed on Mar. 27, 2003.

(51) Int. Cl.
*G09G 5/00* (2006.01)
*G06T 13/00* (2006.01)
*G06F 3/00* (2006.01)

(52) U.S. Cl. .................. 345/619; 345/473; 719/328

(58) Field of Classification Search ......... 345/619–641, 345/473; 719/328
See application file for complete search history.

(56) References Cited

U.S. PATENT DOCUMENTS 5,261,041 A    11/1993    Susman ................ 395/152
5,487,172 A    1/1996    Hyatt ................... 395/800
5,500,933 A    3/1996    Schnorf ................ 395/154
5,509,115 A    4/1996    Butterfield
5,553,222 A    9/1996    Milne .................. 395/154
5,555,368 A    9/1996    Orton .................. 395/157
5,727,141 A    3/1998    Hoddie
5,745,761 A    4/1998    Celi (Continued)

FOREIGN PATENT DOCUMENTS

WO    WO99/00725 A    1/1999

(Continued)

OTHER PUBLICATIONS

Walczak, K. and W. Cellary. "Building Database Applications of Virtual Reality with X-VRML". 2002, Proc. 7th Int. Conf. on 3D Web technology, pp. 111-120, ISBN 1-58113-468-1.☐☐.*

(Continued)

*Primary Examiner*—Ryan R Yang
(74) *Attorney, Agent, or Firm*—Workman Nydegger

(57) ABSTRACT

An element object model and a vector graphics markup language for using that element object model in a manner that allows program code developers to consistently interface with a scene graph data structure to produce graphics. The vector graphics element object model generally corresponds to shape elements and other elements including image and video elements that correlate with a scene graph object model of the scene graph. Markup may be parsed into data including elements in an element tree that is translated into the objects of a scene graph data structure. Other markup may be translated directly into data and calls that create the scene graph objects. The markup language provides distinct ways to describe an element, including a simple string format or complex property syntax, which may be named, enabling reuse in other locations in the markup.

35 Claims, 18 Drawing Sheets

U.S. PATENT DOCUMENTS

| | | | |
|---|---|---|---|
| 5,752,029 | A | 5/1998 | Wissner |
| 5,790,130 | A | 8/1998 | Gannett |
| 5,852,449 | A | 12/1998 | Esslinger .................... 345/473 |
| 5,920,325 | A | 7/1999 | Morgan ...................... 345/473 |
| 5,930,810 | A | 7/1999 | Farros et al. ................ 715/506 |
| 5,936,632 | A | 8/1999 | Cunniff |
| 5,986,667 | A | 11/1999 | Jevans ........................ 345/433 |
| 5,986,675 | A | 11/1999 | Anderson ................... 345/473 |
| 5,987,627 | A | 11/1999 | Rawlings |
| 6,014,139 | A | 1/2000 | Watson et al. ............... 715/764 |
| 6,075,532 | A | 6/2000 | Colleran ..................... 345/340 |
| 6,092,107 | A * | 7/2000 | Eleftheriadis et al. ....... 709/217 |
| 6,115,713 | A | 9/2000 | Pascucci |
| 6,151,134 | A | 11/2000 | Deppa |
| 6,154,215 | A | 11/2000 | Hopcroft .................... 345/418 |
| 6,160,907 | A | 12/2000 | Robotham |
| 6,195,694 | B1 | 2/2001 | Chen et al. .................. 709/220 |
| 6,215,495 | B1 | 4/2001 | Grantham et al. ........... 345/419 |
| 6,237,092 | B1 | 5/2001 | Hayes, Jr. ................... 713/100 |
| 6,243,856 | B1 | 6/2001 | Meyer et al. ................ 717/111 |
| 6,259,451 | B1 | 7/2001 | Tesler ......................... 345/419 |
| 6,266,053 | B1 | 7/2001 | French et al. ............ 715/500.1 |
| 6,272,650 | B1 | 8/2001 | Meyer ......................... 714/38 |
| 6,275,857 | B1 | 8/2001 | McCartney ................. 709/226 |
| 6,314,470 | B1 | 11/2001 | Ward et al. .................. 719/328 |
| 6,377,263 | B1 | 4/2002 | Falacara ..................... 345/473 |
| 6,411,297 | B1 | 6/2002 | Tampieri ..................... 345/426 |
| 6,487,565 | B1 | 11/2002 | Schechter ................ 707/500.1 |
| 6,538,656 | B1 | 3/2003 | Cheung ...................... 345/519 |
| 6,570,578 | B1 | 5/2003 | Smirnov |
| 6,631,403 | B1 | 10/2003 | Deutsch |
| 6,636,211 | B2 | 10/2003 | Chartier |
| 6,654,931 | B1 | 11/2003 | Haskell |
| 6,675,230 | B1 * | 1/2004 | Lewallen .................... 719/328 |
| 6,707,456 | B1 | 3/2004 | Marrin ........................ 345/473 |
| 6,714,201 | B1 | 3/2004 | Grinstein .................... 345/474 |
| 6,717,599 | B1 | 4/2004 | Olano ......................... 715/853 |
| 6,731,314 | B1 | 5/2004 | Cheng ......................... 345/848 |
| 6,732,109 | B2 | 5/2004 | Lindberg .................... 707/101 |
| 6,741,242 | B1 * | 5/2004 | Itoh et al. ................... 345/419 |
| 6,751,655 | B1 | 6/2004 | Deutsch ...................... 709/203 |
| 6,765,571 | B2 | 7/2004 | Sowizral ..................... 345/420 |
| 6,833,840 | B2 | 12/2004 | Lifshitz |
| 6,919,891 | B2 | 7/2005 | Schneider ................... 345/440 |
| 6,986,101 | B2 | 1/2006 | Cooper ....................... 707/513 |
| 7,012,606 | B2 | 3/2006 | Swedberg ................... 345/420 |
| 7,055,092 | B2 | 5/2006 | Yardumian ................. 715/513 |
| 7,064,766 | B2 | 6/2006 | Beda ........................... 345/557 |
| 7,069,503 | B2 | 6/2006 | Tanimoto .................... 715/513 |
| 7,076,332 | B2 | 7/2006 | Cifra ........................... 700/245 |
| 7,088,374 | B2 | 8/2006 | David ......................... 345/420 |
| 7,102,651 | B1 | 9/2006 | Louveaux |
| 7,103,581 | B1 | 9/2006 | Suen |
| 7,103,873 | B2 | 9/2006 | Tanner ........................ 717/109 |
| 7,126,606 | B2 | 10/2006 | Beda ........................... 345/473 |
| 7,143,339 | B2 | 11/2006 | Weinberg .................... 707/509 |
| 7,161,599 | B2 | 1/2007 | Beda ........................... 345/418 |
| 2001/0000962 | A1 | 5/2001 | Rajan .................... 375/240.01 |
| 2002/0019844 | A1 | 2/2002 | Kurowski et al. |
| 2002/0032697 | A1 | 3/2002 | French ........................ 345/440 |
| 2002/0046394 | A1 | 4/2002 | Do .............................. 717/109 |
| 2002/0063704 | A1 | 5/2002 | Sowizral ..................... 345/522 |
| 2002/0116417 | A1 | 8/2002 | Weinberg et al. ........... 707/517 |
| 2003/0005045 | A1 * | 1/2003 | Tanimoto .................... 709/203 |
| 2003/0028901 | A1 | 2/2003 | Shae ........................... 370/487 |
| 2003/0110297 | A1 * | 6/2003 | Tabatabai et al. ........... 709/246 |
| 2003/0120823 | A1 * | 6/2003 | Kim et al. ................... 709/310 |
| 2003/0126557 | A1 * | 7/2003 | Yardumian et al. .......... 715/513 |
| 2003/0132937 | A1 | 7/2003 | Schneider et al. ........... 345/473 |
| 2003/0139848 | A1 | 7/2003 | Cifra et al. .................. 700/245 |
| 2003/0194207 | A1 | 10/2003 | Chung |
| 2003/0210267 | A1 * | 11/2003 | Kylberg |
| 2004/0015740 | A1 * | 1/2004 | Dautelle ...................... 714/37 |
| 2004/0039496 | A1 * | 2/2004 | Dautelle ...................... 701/3 |
| 2004/0093604 | A1 | 5/2004 | Demsey et al. .............. 719/310 |
| 2004/0110490 | A1 * | 6/2004 | Steele et al. ............. 455/412.1 |
| 2004/0189645 | A1 | 9/2004 | Beda et al. .................. 345/473 |
| 2004/0189669 | A1 | 9/2004 | David et al. ................. 345/619 |
| 2004/0216139 | A1 | 10/2004 | Rhoda ........................ 709/320 |
| 2004/0220956 | A1 | 11/2004 | Dillon ......................... 707/102 |
| 2005/0050471 | A1 | 3/2005 | Hallisey et al. ............. 715/734 |
| 2005/0060648 | A1 | 3/2005 | Fennelly ..................... 715/523 |

FOREIGN PATENT DOCUMENTS

WO      WO99/52080 A      10/1999

OTHER PUBLICATIONS

VRML97/VRML 2.0 specification, sections 4, 5, and 6 1997.*
SVG specification version 1.1, Jan. 13, 2003 all sections☐☐http://www.w3.org/TR/SVG/.*
X3D specification (one section from Google cache), sections 6 and 8☐☐-http://www.web3d.org/x3d/specifications/ISO-IEC-19775-IS-X3DAbstractSpecification/..., 2004.*
Sun Java 3D documention—Java 3D API Specification☐☐http://java.sun.com/products/java-media/3D/forDevleopers/j3Guide/ , 1999.*
PCT International Search Report and Written Opinion on application No. PCT/US04/25723.
X3D specification (one section from Google cache), sections 6 and 8—http://www.web3d.org/x3d/specifications/ISO-IEC-19775-IS-X3DAbstractSpecification/....
U.S. Appl. No. 11/555,040, filed Oct. 31, 2006, Beda.
U.S. Appl. No. 11/165,756, filed Jun. 23, 2005, Schneider.
U.S. Appl. No. 11/455,166, filed Jun. 16, 2006, Beda.
U.S. Appl. No. 11/454,719, filed Jun. 16, 2006, Beda.
U.S. Appl. No. 10/693,822, filed Oct. 23, 2003, Blanco.
U.S. Appl. No. 10/401, 717, filed Mar. 27, 2003, Beda.
U.S. Appl. No. 10/693,673, filed Oct. 23, 2003, Beda.
U.S. Appl. No. 100/693,633, filed Oct. 23, 2003, Beda.
U.S. Appl. No. 10/693,630, filed Oct. 23, 2003, Subramanian.
U.S. Appl. No. 11/499,257, filed Aug. 4, 2006, David.
Walczak, K. and W. Cellary. "Building Database Applications of Virtual Reality with X-VRML". Proc. 7th. Int. Conf. on 3D Web Technology. 2002, SIGGRAPH. pp. 11-120. ISBN 1-58113-468-1.
Parr, T. and T. Rohaly. "A language for creating and manipulating VRML." Proc. 1st Symposium on Virtual Reality Modeling Lang. 1995, pp. 123-131.
Hesina, G.; Schmalistieg, D.; Furhmann, A.; Purgathofer, W. "Distributed Open Inventor: a practical approach to distributed 3D graphics." Proc. ACM Symp. On Virt. Reality Soft. And Tech. 1999, pp. 74-81.
Strauss, P. and R. Carey. "An Object-Oriented 3D Graphics Toolkit" SIGGRAPH (Proc. 19th Ann. Conf. on Comp. Graph. And Int. Tech.) 1992, pp. 341-349.
Rikk Cary, Gavin Bell, Chris Marrin: "International Standard iso/iec 14772-1; 1997 Virtual Reality Modeling Language (vrml97)" VRML 97, 1997 pp. 1-236 XP002133320 p. 7, paragraph 3.18: pp. 89-99 section 6.20; p. 149, paragraph B.2.
SVG specification version 1.1, Jan. 14, 2003 all sections. http://www.w3.org/TR/SVG.
Java 3D API Specification: Scene Graph Basics. Sun Microsystems, Inc. 1999. http://java.sun.com/products/java-media/3D/forDevelopers/j3dguide/SceneGraphOverview.doc.html.
SVG Tools, Adobe Illustrator, Jul. 6, 2001—http://web.archive.org/web/20010706131221/http://www.adobe.com/svg/tools/other.html.
Scalable Vector Graphics, Adobe SVG Viewer download area, Nov. 2001—http://www.adobe.com/svg/viewer/install/main.html.
W3C Scalable Vector Graphics (SVG)-History-http://www.w3.org/Graphics/SVG/History.
W3C consortium,/ "XML Base", W3c recommendation Jun. 27, 2001.
PCT Int'l Search Report & Written Opinion on App. No. PCT/US04/25723.

Partial European Search Report in EP 02023604 documents considered relevant.

Australian Search Report, Application No. SG 200302787-7 completed Jan. 12, 2005.

Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451 p. 16, col. 2.

Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.

X3D specification (one section from Google cache), sections 6 and 18—http://www.web3d.org/x3dspecifications/ISO-IEC-19775-IS-X3DAbstractSpecification/..., Jan. 19, 2005.

Notice of Allowance dated Jul. 2, 2007 cited in related Issued Patent No. 7,265,756.

Office Action dated Apr. 4, 2008 cited in related U.S. Appl. No. 11/454,719.

Office Action dated Sep. 11, 2007 cited in related U.S. Appl. No. 10/693,822.

Office Action dated Nov. 16, 2007 cited in related U.S. Appl. No. 10/401,717.

Office Action dated Jul. 17, 2007 cited in related U.S. Appl. No. 10/693,630.

Office Action dated Mar. 20, 2008 cited in related U.S. Appl. No. 10/693,630.

Office Action dated Oct. 05, 2007 cited in related U.S. Appl. No. 10/693,673.

Office Action dated Jan. 10, 2008 cited in related U.S. Appl. No. 10/693,673.

Office Action dated Apr. 3, 2008 cited in related U.S. Appl. No. 11/499,257.

Notice of Allowance dated Apr. 1, 2008 cited in related U.S. Appl. No. 10/693,822.

Conal Elliot, Declarative event-oriented programming, Proceedings of the 2nd ACM SIGPLAN international conference on Principles and practice of declaratice programming, p. 56-67, Sep. 20-23, 2000, Montreal, Quebec, Canada.

* cited by examiner

MARKUP LANGUAGE AND OBJECT MODEL FOR VECTOR GRAPHICS

CROSS-REFERENCE TO RELATED APPLICATIONS

The present invention is a continuation-in-part of U.S. patent application Ser. No. 10/401,717 filed Mar. 27, 2003.

FIELD OF THE INVENTION

The invention relates generally to computer systems, and more particularly to the processing of graphical and other video information for display on computer systems.

BACKGROUND OF THE INVENTION

The limits of the traditional immediate mode model of accessing graphics on computer systems are being reached, in part because memory and bus speeds have not kept up with the advancements in main processors and/or graphics processors. In general, the current (e.g., WM_PAINT) model for preparing a frame requires too much data processing to keep up with the hardware refresh rate when complex graphics effects are desired. As a result, when complex graphics effects are attempted with conventional graphics models, instead of completing the changes that result in the perceived visual effects in time for the next frame, the changes may be added over different frames, causing results that are visually and noticeably undesirable.

A new model for controlling graphics output is described in U.S. patent application Ser. Nos. 10/184,795, 10/184,796, 10/185,775, 10/401,717, 10/402,322 and 10/402,268, assigned to the assignee of the present invention and hereby incorporated by reference. This new model provides a number of significant improvements in graphics processing technology. For example, U.S. Ser. No. 10/184,795 is generally directed towards a multiple-level graphics processing system and method, in which a higher-level component (e.g., of an operating system) performs computationally intensive aspects of building a scene graph, updating animation parameters and traversing the scene graph's data structures, at a relatively low operating rate, in order to pass simplified data structures and/or graphics commands to a low-level component. Because the high-level processing greatly simplifies the data, the low-level component can operate at a faster rate, (relative to the high-level component), such as a rate that corresponds to the frame refresh rate of the graphics subsystem, to process the data into constant output data for the graphics subsystem. When animation is used, instead of having to redraw an entire scene with changes, the low-level processing may interpolate parameter intervals as necessary to obtain instantaneous values that when rendered provide a slightly changed scene for each frame, providing smooth animation.

U.S. Ser. No. 10/184,796 describes a parameterized scene graph that provides mutable (animated) values and parameterized graph containers such that program code that wants to draw graphics (e.g., an application program or operating system component) can selectively change certain aspects of the scene graph description, while leaving other aspects intact. The program code can also reuse already-built portions of the scene graph, with possibly different parameters. As can be appreciated, the ability to easily change the appearance of displayed items via parameterization and/or the reuse of existing parts of a scene graph provide substantial gains in overall graphics processing efficiency.

U.S. Ser. No. 10/185,775 generally describes a caching data structure and related mechanisms for storing visual information via objects and data in a scene graph. The data structure is generally associated with mechanisms that intelligently control how the visual information therein is populated and used. For example, unless specifically requested by the application program, most of the information stored in the data structure has no external reference to it, which enables this information to be optimized or otherwise processed. As can be appreciated, this provides efficiency and conservation of resources, e.g., the data in the cache data structure can be processed into a different format that is more compact and/or reduces the need for subsequent, repeated processing, such as a bitmap or other post-processing result.

While the above improvements provide substantial benefits in graphics processing technology, there still needs to be a way for programs to effectively use this improved graphics model and its other related improvements in a straightforward manner. What is needed is a comprehensive yet straightforward model for programs to take advantage of the many features and graphics processing capabilities provided by the improved graphics model and thereby output complex graphics and audiovisual data in an efficient manner.

SUMMARY OF THE INVENTION

Briefly, the present invention provides an element object model and a vector graphics markup language for accessing that element object model in a manner that allows program code developers to consistently interface with a scene graph data structure to produce graphics. The vector graphics markup language comprises an interchange format for expressing vector graphics via the element object model. When interpreted, the markup is parsed into data including elements in an element tree that is translated into the objects of a scene graph data structure. At the element tree level, a property system and layout system are provided to provide rich programmability features, including inheritance characteristics and eventing, making it straightforward for scene designers to design possibly complex scenes. In general, the vector graphics elements correspond to shape elements and other elements including image and video elements that correlate with scene graph objects of the scene graph object model. The properties and other resources of the vector graphics elements also correlate with similar properties and resources the scene graph object model.

The vector graphics system can thus program to an element level, in which each of the drawing shapes is represented as an element at the same level as the rest of the programmable elements in a page/screen, allowing interaction with the layout system, events and properties. The vector graphics system also provides a mechanism for programming to a resource level, by which scene designers can essentially shortcut the element tree and layout system and program directly to the visual API layer that interfaces with the scene graph data structure. This provides a more efficient and lightweight way to output the appropriate object, although losing of some of the programmability of the element level. In one implementation, when a fill of type "visual brush" is programmed, the parser can directly call the API layer with resource level data to create a corresponding visual paint object (which is also a correlation between the element object model and the scene graph object model). In this two-tiered system, element level vector graphics get parsed into created elements, which need later translation to the objects, while resource level vector graphics get parsed and directly stored in an efficient manner. At the same time, the resource level data or the objects created thereby can be referenced by elements and part of the element tree. To this end, elements including visual paint elements may be named. The scene designer thus has the ability to balance efficiency against programmability as needed.

The element class hierarchy includes a shape class, an image class, a video class and a canvas class. Elements of the shape class include rectangle, polyline, polygon, path, line and ellipse. Each element may include or be associated with fill (property) data, stroke data, clipping data, transform data, filter effect data and mask data. Shapes correspond to geometry (of the scene graph object model) that is drawn with inherited and cascaded presentation properties that are used to construct the pen and the brush needed to draw the shapes. The image class is more specific than a shape and can include more raster graphical data, while the video class allows video (or similar multimedia) to be played within a displayed element. The canvas class may act as a container for shapes, to keep shapes lightweight.

In one implementation the markup code is interpreted by a parser/translator which generally adds element-level elements to an element tree/property system and attaches data to those elements. The layout system then takes the element tree with the attached presenters and translates the data to objects (via a builder) and calls to a visual API layer that interfaces with the scene graph and creates the scene graph objects.

The markup language provides distinct ways to describe an element, including a simple string format or a complex object notation (a complex property syntax). For a simple string format, the parser/translator and/or layout system uses a type converter for converting a string to an appropriate visual API object. When the fill attribute is too complex to fit into a single string, complex property syntax, which may be inline in the markup, is used to describe the property set. Because the same rendering model is shared between the element level and the API level, many of the objects are the same, which makes parsing/translation highly efficient and provides other benefits. A resource instance also may be located elsewhere (e.g., in the markup or a file), and referenced by a name. In this manner, a scene designer can reuse an element in the element tree throughout a scene, including elements described by the complex property syntax.

Other benefits and advantages will become apparent from the following detailed description when taken in conjunction with the drawings, in which:

DETAILED DESCRIPTION

Exemplary Operating Environment

Figure 1:
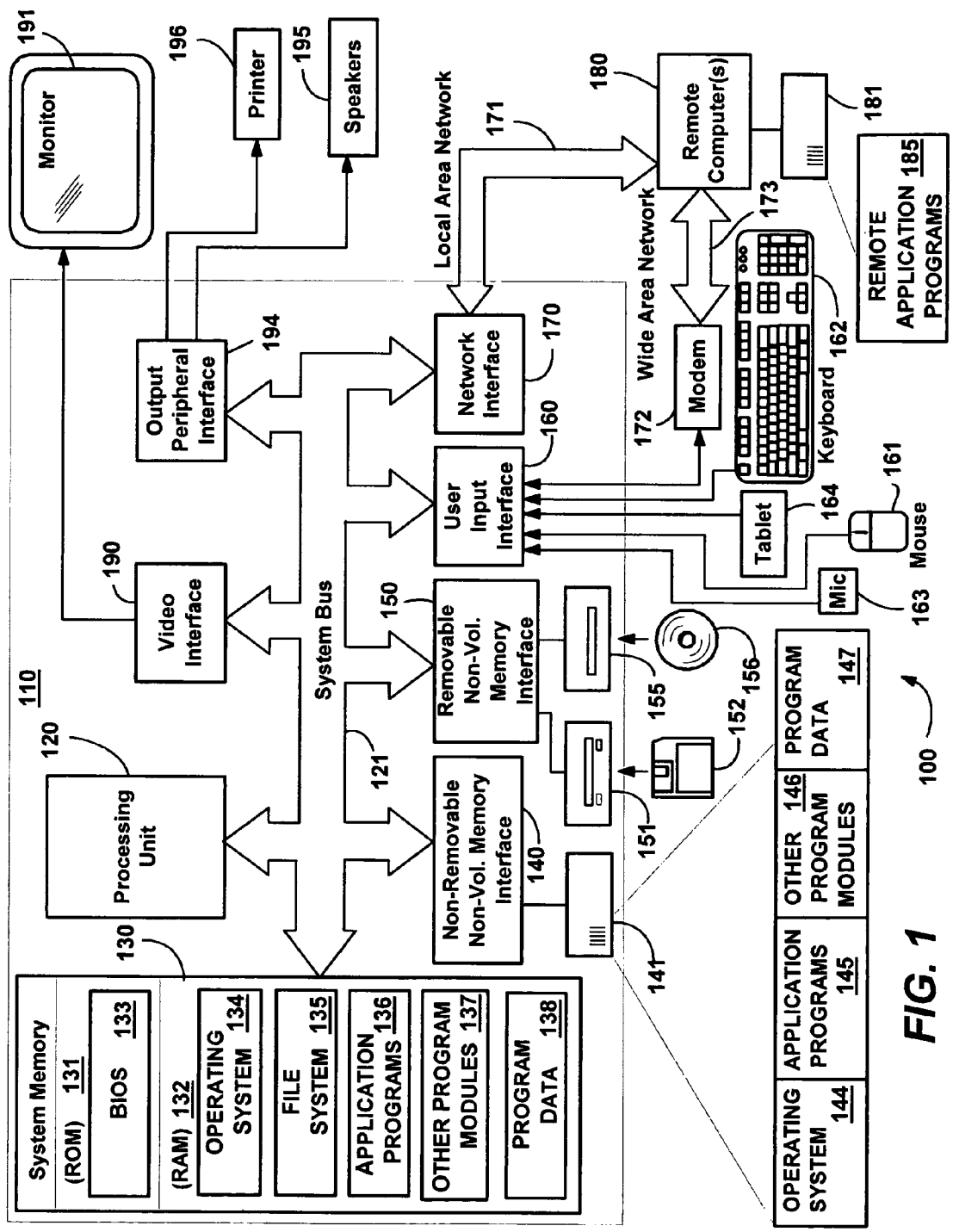
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Graphics Architecture

One aspect of the present invention is generally directed to allowing program code, such as an application or operating system component, to communicate drawing instructions and other information (e.g., image bitmaps) to graphics components in order to render graphical output on the system display. To this end, the present invention provides a markup language along with a set of shape elements and other elements, a grouping and compositing system, and integration with a general property system in an object model to enable programs to populate a scene graph with data structures, drawing primitives (commands), and other graphics-related data. When processed, the scene graph results in graphics being displayed on the screen.

Figure 2:
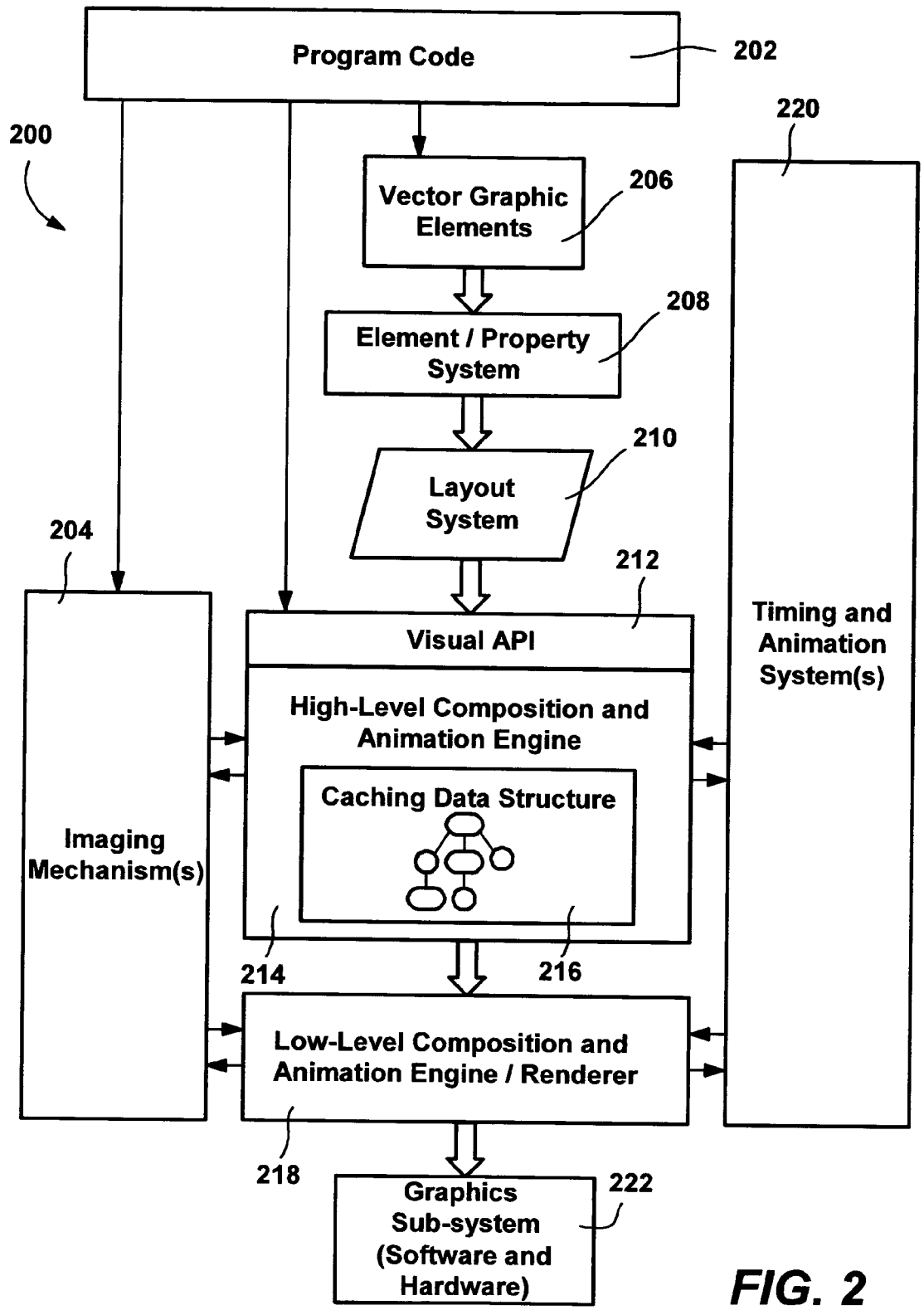
FIG. 2 is a block diagram generally representing a graphics layer architecture into which the present invention may be incorporated.

FIG. 2 represents a general, layered architecture 200 into which the present invention may be implemented. As represented in FIG. 2, program code 202 (e.g., an application program or operating system component or the like) may be developed to output graphics data in one or more various ways, including via imaging 204, via vector graphic elements 206, and/or via function/method calls placed directly to a visual application programming interface (API) layer 212. Direct interaction with the API layer is further described in the aforementioned copending patent application entitled "Visual and Scene Graph Interfaces."

In general, imaging 204 provides the program code 202 with a mechanism for loading, editing and saving images, e.g., bitmaps. These images may be used by other parts of the system, and there is also a way to use the primitive drawing code to draw to an image directly.

In accordance with an aspect of the present invention, vector graphics elements 206 provide another way to draw graphics, consistent with the rest of the object model (as described below). Vector graphic elements 206 may be created via a markup language, which an element/property system 208 and layout system 210 processes to make appropriate calls to the visual API layer 212. As described below, in general the vector graphic elements 206 are parsed into objects of the object model from which a scene graph is drawn, which may be provided to the scene graph via an element level via the element/property system 208 and layout system 210, or may be provided in a more efficient manner at a resource level, as also described below.

In one implementation, the graphics layer architecture 200 includes a high-level composition and animation engine 214, which includes or is otherwise associated with a caching data structure 216. The caching data structure 216 contains a scene graph comprising hierarchically-arranged objects that are managed according to a defined object model, as described below. In general, the visual API layer 212 provides the program code 202 (and the layout system 210) with an interface to the caching data structure 216, including the ability to create objects, open and close objects to provide data to them, and so forth. In other words, the high-level composition and animation engine 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

In one implementation, the high-level composition and animation engine 214 passes an instruction stream and possibly other data (e.g., pointers to bitmaps) to a fast, low-level compositing and animation engine 218. As used herein, the terms "high-level" and "low-level" are similar to those used in other computing scenarios, wherein in general, the lower a software component is relative to higher components, the closer that component is to the hardware. Thus, for example, graphics information sent from the high-level composition and animation engine 214 may be received at the low-level compositing and animation engine 218, where the information is used to send graphics data to the graphics subsystem including the hardware 222.

The high-level composition and animation engine 214 in conjunction with the program code 202 builds a scene graph to represent a graphics scene provided by the program code 202. For example, each item to be drawn may be loaded with drawing instructions, which the system can cache in the scene graph data structure 216. As will be described below, there are a number of various ways to specify this data structure 216, and what is drawn. Further, the high-level composition and animation engine 214 integrates with timing and animation systems 220 to provide declarative (or other) animation control (e.g., animation intervals) and timing control. Note that the animation system allows animate values to be passed essentially anywhere in the system, including, for example, at the element property level 208, inside of the visual API layer 212, and in any of the other resources. The timing system is exposed at the element and visual levels.

The low-level compositing and animation engine 218 manages the composing, animating and rendering of the scene, which is then provided to the graphics subsystem 222. The low-level engine 218 composes the renderings for the scenes of multiple applications, and with rendering components, implements the actual rendering of graphics to the screen. Note, however, that at times it may be necessary and/or advantageous for some of the rendering to happen at higher levels. For example, while the lower layers service requests from multiple applications, the higher layers are instantiated on a per-application basis, whereby is possible via the imaging mechanisms 204 to perform time-consuming or application-specific rendering at higher levels, and pass references to a bitmap to the lower layers.

Scene Graph Object Model

As described below, the rendering model is shared by the higher-level, control-based vector graphics elements 206, and the lower-level objects created by the visual API layer 212 used in the scene graph data structure 216. This provides a significant amount of correlation between the higher-level elements of the present invention, and the lower-level objects. The following describes one implementation of the scene graph object model.

The present invention offers several layers of access to graphics and rendering services. At a top layer, Vector Graphics) provides a number of advantages common to XML-based graphics markup, including that it is straightforward to use with the object model of the present invention, it is readily reusable, and it is generally familiar to users of similar systems. Objects are available as markup elements, with properties exposed either as attributes on those elements or as complex properties.

The present invention renders graphics content through the use of Visual objects. This underlying Visual layer is available in several ways. Programmers can access visuals directly in code; they can program using the object model; and, in accordance with an aspect of the present invention, they can use XML-based markup.

Predefined vector shapes are available in Vector Graphics, like the Polygon and Path elements, and are contained within a layout element, such as Canvas, Dock Panel, and Flow Panel. The Canvas element provides a means for absolutely positioning elements within a parent space. For the Canvas and its child shapes, the default unit of measurement for screen coordinates is the device independent pixel. Dock-Panel and FlowPanel provide a number of size and alignment properties, as well as control over borders.

Vector Graphics provides a number of defined vector graphics shapes that will be familiar to users of SVG. These elements inherit from the Shape class, and include Ellipse, Line, Path, Polygon, Polyline, and Rectangle. These elements inherit a number of common attributes from Shape, including Stroke and StrokeThickness, Fill, and data attributes to specify coordinates and vertices. Developers can also skew, rotate, translate, and scale shapes by applying transformations.

The Line element provides a convenient example. The following example specifies coordinates for the start and end points, a stroke color and width, and rounded capping on the ends of the line.

```
<Canvas ID="root"
    xmlns="http://schemas.microsoft.com/2003/xaml"
    Background="White">
    <Line Stroke="#000000"
        StrokeThickness="10"
        StrokeStartLineCap="2"
        StrokeEndLineCap="2"
        X1="200"
        Y1="10"
        X2="50"
        Y2="300"/>
</Canvas>
```

An Ellipse is created by defining the shape's center with the CenterX and CenterY properties. Instead of specifying foci, the bounds of the ellipse are set by setting the RadiusX and RadiusY properties. To draw a circle in Vector Graphics, the developer can specify an ellipse whose RadiusX and RadiusY values are equal.

```
<Ellipse
    Fill="yellow"
    CenterX="3in"
    CenterY="2.2in"
    RadiusX="1in"
    RadiusY="2in"
    FillOpacity="0.3"
    StrokeWidth="4px"
    Stroke="blue"/>
```

The Path object provides the means to draw curves and complex shapes, whether open or closed. Path exposes the properties generally available on objects that inherit from the Shape class, but also enables developers to specify more complex parameters to describe curves. Developers can use paths in markup in various ways, including to specify path data using a special syntax in the Data, or specify individual path segments using the PathGeometry and PathGeometry objects.

The coordinate pairs and inline parameters provided for the Data attribute can specify line segments, Bézier curves, and a variety of other path specifications. The following example shows a Path element that defines two subpaths.

```
<Canvas ID="root"
    xmlns="http://schemas.microsoft.com/2003/xaml"
    Background="White">
    <Path Data="M 100,200 C 100,25 400,350 400,175 H 280"
        Stroke="DarkGoldenRod"
        StrokeThickness="3"/>s
</Canvas>
```

The Data attribute string begins with the "moveto" command, indicated by M, which establishes a start point for the path in the coordinate system of the Canvas. Path data parameters are case-sensitive. The capital M indicates an absolute location for the new current point. A lowercase m would indicate relative coordinates. The first subpath is a cubic Bézier curve beginning at (100,200) and ending at (400,175), drawn using the two control points (100,25) and (400,350). This subpath is indicated by the C command in the Data attribute string. Again, the capital C indicates an absolute path; the lowercase c would indicate a relative path.

The second subpath begins with an absolute horizontal "lineto" command H, which specifies a line drawn from the preceding subpath's endpoint (400,175) to a new endpoint (280,175). Because it is a horizontal "lineto" command, the value specified is an x-axis coordinate.

It is also possible to use a more verbose syntax to specify path data in markup, which might have the advantage of allowing the developer to specify complex properties and make the markup more readable. In this case, the PathGeometry object may be used to create complex shapes, such as arcs and curves. PathGeometry objects are comprised of one or more PathFigure objects; each PathFigure represents a different "figure" or shape. Each PathFigure is itself comprised of one or more PathSegment objects, each representing a connected portion of the figure or shape. Segment types include LineSegment, BezierSegment, and ArcSegment.

The following code specifies path data by using the PathGeometry and a PathFigure; several segments are added to the PathFigure to form a shape. In this case, segments have been added using the PathFigure object's Segments property. This markup creates four Bézier curves. Note that the first segment of a PathFigure is a StartSegment:

```
<Canvas ID="root"
Background="White"
xmlns="http://schemas.microsoft.com/2003/xaml">
<Path ID="myPath"
    Fill="Blue"
    Stroke="Black"
    StrokeThickness="5">
    <Path.Data>
        <GeometryCollection>
            <PathGeometry>
                <PathGeometry.Figures>
                    <PathFigureCollection>
                        <PathFigure>
                            <PathFigure.Segments>
                                <PathSegmentCollection>
                                    <StartSegment Point=
                                    "400,100"/>
                                    <BezierSegment Point1=
                                    "400,100"
Point2="400,200" Point3="200,300"/>
                                    <BezierSegment Point1=
                                    "400,300"
Point2="400,100" Point3="200,50"/>
                                    <BezierSegment Point1=
                                    "0,100"
Point2="0,200" Point3="200,300"/>
                                    <BezierSegment Point1=
                                    "0,300"
Point2="0,100" Point3="200,50"/>
                                </PathSegmentCollection>
                            </PathFigure.Segments>
                        </PathFigure>
                    </PathFigureCollection>
                </PathGeometry.Figures>
            </PathGeometry>
        </GeometryCollection>
    </Path.Data>
</Path>
</Canvas>
```

The Vector Graphics shapes expose various attributes of the Brush object to specify the color of their Stroke and Fill. The following example specifies these attributes on Canvas and Ellipse elements. Note that valid input for color properties can be either a keyword or hexadecimal color value.

```
<Canvas ID="root"
    xmlns="http://schemas.microsoft.com/2003/xaml"
        Background="LightGray">
        <Ellipse
            Fill="#FFFFFF00"
            CenterX="100"
            CenterY="200"
            RadiusX="75"
            RadiusY="75"
            StrokeThickness="5"
            Stroke="#FF0000FF"/>
</Canvas>
```

Alternatively, a developer can use complex property syntax and the SolidColorBrush class to specify colors. Specifying properties using more complex syntax becomes necessary when reusing graphics markup with property sheets, or to animate shape properties like color.

```
<Canvas ID="root"
    xmlns="http://schemas.microsoft.com/2003/xaml"
        Background="LightGray">
```

This irregular polyline shape uses pre-defined color values for the Stroke and Fill properties. The FillOpacity property affects the fill color in this case by making it slightly transparent (opacity of 0.8) so that it blends with any underlying color:

```
<Polyline
    Points="300,200 400,125 400,275 300,200"
    Stroke="Purple"
    StrokeThickness="2.3">
<Polyline.Fill>
    <SolidColorBrush Color="Blue" Opacity="0.4"/>
</Polyline.Fill>
</Polyline></Canvas>
```

Just as when specifying solid color fills and backgrounds for shapes, gradients may be specified. The following example sets a horizontal gradient as the Fill property of a Rectangle, with Blue as the start color and Red as the end color.

```
<Rectangle
    Fill="HorizontalGradient Blue Red"
    RectangleLeft="120"
    RectangleTop="120"
    RectangleWidth="100"
    RectangleHeight="100">
</Rectangle>
```

A developer can also specify gradients with complex property notation. This notation provides a greater degree of specificity in rendering the gradient and exposes additional properties. To animate a shape's fill with a gradient, for example, complex notation would be used. The following example uses the RadialGradientBrush object to set a gradient on a Rectangle. The RadialGradientBrush object provides access to the gradient's properties, like its radius and any transforms or animations that might be set on it; these properties are inherited from GradientBrush. The GradientStopCollection collection enables the developer to specify multiple gradient stops and indicate their Offset (the location of the stop in the gradient):

```
<Rectangle RectangleLeft="10" RectangleTop="250"
    RectangleWidth="300" RectangleHeight="200">
    <Rectangle.Fill>
        <RadialGradientBrush Focus="0.5,0.5">
            <RadialGradientBrush.GradientStops>
                <GradientStopCollection>
                    <GradientStop Color="red" Offset="0"/>
                    <GradientStop Color="yellow" Offset="1"/>
                    <GradientStop Color="blue" Offset="0.5"/>
                </GradientStopCollection>
            </RadialGradientBrush.GradientStops>
        </RadialGradientBrush>
    </Rectangle.Fill>
</Rectangle>
```

The present invention provides standard transformations for vector-drawn shapes. A developer can skew shapes, rotate them, change their scale, and translate (reposition) them either as static graphics or in animations. To use the Transform objects in markup, they need to be specified as children of the TransformDecorator.

The ScaleTransform transformation is the most straightforward of the available transformations, and is used by simply specifying a factor by which the element should be resized. The following example resizes a Polygon element by 150 percent along the y-axis of the coordinate system of the parent Canvas:

```
<Canvas ID="root"
    xmlns="http://schemas.microsoft.com/2003/xaml">
        <TransformDecorator AffectsLayout="false">
    <TransformDecorator.Transform>
                          <ScaleTransform ScaleX="1"
ScaleY="1.5" />
        </TransformDecorator.Transform>
        <Polygon ID="star3"
        Stroke="red"
        StrokeThickness="2.0"
        Points="176.5,50 189.2,155.003 286.485,113.5 201.9,177
286.485,240.5
        189.2,198.997 176.5,304 163.8,198.997 66.5148,240.5
151.1,177 66.5148,113.5
        163.8,155.003" />
        </TransformDecorator>
    </Canvas>
```

Note that if specifying further transformations in the same TransformDecorator object, the need to be enclosed in a TransformCollection. Also, the order in which each transformation is parsed and applied makes a difference in the final effect. For example, rotating an element before translating it to different screen coordinates may make a difference.

The following example shows a rotation and a translation applied to two polyline elements:

```
<!-- Rotate, then translate -->
<TransformDecorator AffectsLayout="false">
<TransformDecorator.Transform>
        <TransformCollection>
            <RotateTransform Angle="45" />
            <TranslateTransform X="100" Y="100"
/>
        </TransformCollection>
</TransformDecorator.Transform>
<Polyline ID="box4"
    Stroke="Green"
    StrokeThickness="5"
    Points="0,0 10,10 10,50 50,50 50,10 10,10">
</Polyline>
</TransformDecorator>
<!-- Translate, then rotate -->
<TransformDecorator AffectsLayout="false">
<TransformDecorator.Transform>
        <TransformCollection>
            <TranslateTransform X="200" Y="200"
/>
            <RotateTransform Angle="15" />
        </TransformCollection>
</TransformDecorator.Transform>
<Polyline ID="box5"
    Stroke="Cyan"
    StrokeThickness="5"
    Points="0,0 10,10 10,50 50,50 50,10 10,10">
</Polyline>
</TransformDecorator>
```

Note that these two transformations do not yield the same final screen position for their respective shapes. When using the rotation transformation, the transformation rotates the entire coordinate system for a particular element. Depending on an element's position with respect to the origin, the effect of the rotation might not be to rotate it "in place." For example, for an element positioned 200 units from zero along the x-axis, for instance, a rotation of 30 degrees has the effect of swinging the element 30 degrees along a circle with radius 200, drawn around the origin. For this reason, it is more straightforward when dealing with a Transform to translate the element to the origin, apply a rotation, skew, or scale transformation, and then translate the element back to its eventual location.

A particular syntax may be used to specify a rotation around a particular point, independent of other translations in the transform settings. In effect, this syntax specifies a translation to a new origin, a rotation, and a translation back to the former origin. To specify a rotation of r degrees around a point (cx,cy), use the following syntax:

transform="rotate(rx [cx,cy])"

The skew transformation enables the developer to distort a shape along one or both axes. The SkewTransform class provides AngleX and AngleY properties that specify a proportional offset along either axis.

```
<Canvas ID="root"
    xmlns="http://schemas.microsoft.com/2003/xaml">
    <!-- Skewed in X -->
    <TransformDecorator AffectsLayout="false">
    <TransformDecorator.Transform>
        <TransformCollection>
            <SkewTransform AngleX="30" />
            <TranslateTransform X="0" Y="100" />
        </TransformCollection>
    </TransformDecorator.Transform>
        <Rectangle
        RectangleTop="30"
        RectangleLeft="30"
        RectangleWidth="80"
        RectangleHeight="50"
        Stroke="Red"
        StrokeThickness="5" />
    </TransformDecorator>
    <!-- Skewed in Y -->
    <TransformDecorator AffectsLayout="false">
    <TransformDecorator.Transform>
        <TransformCollection>
            <SkewTransform AngleY="10" />
            <TranslateTransform X="0" Y="200" />
        </TransformCollection>
    </TransformDecorator.Transform>
        <Rectangle
        RectangleTop="30"
        RectangleLeft="30"
        RectangleWidth="80"
        RectangleHeight="50"
        Stroke="Blue"
        StrokeThickness="5" >
    </Rectangle>
    </TransformDecorator>
```

As with the other transformations, the effect of applying skew transforms is to skew the coordinate system, not merely the shape. Thus, the coordinate system is skewed from the origin, wherever that origin is set. If skewing transformations on shapes that are some distance from the origin, the "empty space" also reflects the skew, affecting element positioning. For the same reason, the order in which developers apply positioning transformations affects a rendered skew or rotation.

A brush is used anytime color is added to a shape or control. The present invention provides markup that enables the developer's application to paint a user interface (UI) element with anything from a simple solid color to a complex set of patterns and images.

Brushes can color the interior and edges of shapes drawn on a canvas. They can also be used to change the appearance of any elements that make up the UI. The following are some attributes of the Brush type and can accept any of the brushes:

Control.Background
Control.BorderBrush
Column.Background

Text.Foreground
Shape.Fill
Shape.Stroke

There are two main types of brushes, namely vector and bitmap brushes. Vector-based brushes include SolidColorBrush, LinearGradientBrush, RadialGradientBrush, and DrawingBrush (although a DrawingBrush can contain shapes filled with bitmaps). Bitmap-based brushes include ImageBrush and NineGridBrush. In general, bitmaps lose quality when stretched or scaled to fill an area; vectors do not. Therefore, vector-based brushes should be used whenever possible.

A basic type of fill is a SolidColorBrush, which fills an area with a solid color. There are several ways to specify a solid color. Well-known colors can be selected by name. For example, the Fill attribute of a shape can be set to "Red." A color can be chosen from the 32-bit color palette by specifying the amounts of red, green, and blue to combine into a single solid color. The format for specifying a color from the 32-bit palette is "#RRGGBB", where RR is a two digit hexadecimal number specifying the relative amount of red, GG specifies the amount of green, and BB specifies the amount of blue. Additionally, the color can be specified as "#AARRGGBB" where AA specifies the alpha channel, or transparency, of the color. Other color schemes are feasible.

In the following example, the Fill of an Ellipse element is set using one of the predefined color names.

```
<Canvas
    xmlns="http://schemas.microsoft.com/2003/xaml">
    <Ellipse
        Fill="Red"
        CenterX="80"
        CenterY="80"
        RadiusX="50"
        RadiusY="50" />
</Canvas>
```

While the alpha channel can be specified directly in any solid color brush, it can also be specified with the brush's Opacity property. The opacity of an entire element and its child elements may be specified using the UIElement.Opacity property. Each of these values is specified as a Double between zero and one. A value of one is fully opaque and a value of zero is fully transparent. The various methods of describing opacity are cumulative. That is, if the alpha channel is 0x7F (50 percent opacity) and the UIElement.Opacity property is 0.5 (50 percent opacity), the element is painted with 25 percent opacity.

A gradient brush is a fill that changes from one color to another along an axis. There are two types of gradients supported in Vector Graphics (Vector Graphics): linear and radial gradients.

The basic building block of a gradient brush is the gradient stop. A gradient stop specifies a color at a relative offset along the gradient axis. The color of the points between gradient stops is linearly interpolated as a combination of the color specified by the two bounding gradient stops. The offset is a Double that ranges from zero to one. Examples of Gradients are set forth below.

One way to have a Gradient brush is by specifying gradient stops explicitly. The following is an example:

```
<Button.Background>
    <LinearGradientBrush>
        <LinearGradientBrush.GradientStops>
            <GradientStopCollection>
                <GradientStop Color="Red" Offset="0" />
                <GradientStop Color="Blue" Offset="0.25"/>
```

-continued

```
                <GradientStop Color="Orange" Offset="0.75"/>
                <GradientStop Color="Yellow" Offset="1"/>
            </Gradient StopCollection>
        </LinearGradientBrush.GradientStops>
    </LinearGradientBrush>
</Button.Background>
```

In the following example, a LinearGradientBrush is used to fill the Background of a Button with a linear gradient that has four gradient stops.

```
<Button.Background>
    <LinearGradientBrush>
        <LinearGradientBrush.GradientStops>
            <GradientStopCollection>
                <GradientStop Color="Red" Offset="0" />
                <GradientStop Color="Blue" Offset="0.25"/>
                <GradientStop Color="Orange" Offset="0.75"/>
                <GradientStop Color="Yellow" Offset="1"/>
            </GradientStopCollection>
        </LinearGradientBrush.GradientStops>
    </LinearGradientBrush>
</Button.Background>
```

A RadialGradientBrush is used to fill an area with a radial gradient. A radial gradient is similar to a linear gradient, but the gradient axis is from the interior of an ellipse to the exterior. A circle filled with a radial gradient might have a yellow center and a green outline, with interpolated colors in between. The following image shows a rectangle filled with a radial gradient that goes from white to grey. The outside circle represents the gradient circle while the red dot denotes the focal point. This gradient has its SpreadMethod set to Pad.

In the following example, the Fill property of a Rectangle element is set using a RadialGradientBrush. The radial gradient has a Focus point of (0.5,0.5).

```
<Rectangle.Fill>
    <RadialGradientBrush Focus="0.5,0.5">
        <RadialGradientBrush.GradientStops>
            <GradientStopCollection>
                <GradientStop Color="red" Offset="0"/>
                <GradientStop Color="yellow" Offset="1"/>
                <GradientStop Color="blue" Offset="0.5"/>
            </GradientStopCollection>
        </RadialGradientBrush.GradientStops>
    </RadialGradientBrush>
</Rectangle.Fill>
```

When creating a gradient with only two colors, keywords can be used for the stroke, fill, and background properties to simplify the notation. The following sample shows how to create a rectangle filled with a horizontal gradient, a type of linear gradient, that changes from blue to red.

```
<Rectangle
    Fill="HorizontalGradient Blue Red"
    RectangleLeft="120"
    RectangleTop="120"
    RectangleWidth="100"
    RectangleHeight="100" />
```

The abbreviated syntax for creating horizontal, vertical, and radial gradients is the following:
GradientType StartColor EndColor, where GradientType is VerticalGradient, HorizontalGradient, or RadialGradient.
StartColor and EndColor may be predefined color names (such as Blue) or hexadecimal values.

A vertical gradient is a linear gradient whose start and end points form a vertical line; similarly, a horizontal gradient is a linear gradient whose start and end points form a horizontal line. Developers can explicitly describe their own two-color linear gradients using the following syntax: LinearGradient StartPoint EndPoint StartColor EndColor, where StartPoint and EndPoint are the starting and ending coordinates, with each coordinate expressed as a pair of x and y values from zero to one, such as 0.1,0.1 and 0.5,0.5. These values indicate the relative position of the start or end point; an end point of 0.5,0.5 would be located 50 percent to the right of the fill area and 50 percent of the way from the top of the area-placing the point in the middle of the shape.

In the following example, the Fill property of a Rectangle element is set by explicitly using a linear gradient.

```
<Rectangle
    Fill="LinearGradient 0.1,0.1 0.5,0.5 Blue Green"
    RectangleLeft="220"
    RectangleTop="220"
    RectangleWidth="100"
    RectangleHeight="100" />
```

The following example demonstrates how to fill an area with a two-color radial gradient using abbreviated syntax:

```
<Rectangle
    Fill="RadialGradient Blue Red"
    RectangleLeft="320"
    RectangleTop="320"
    RectangleWidth="100"
    RectangleHeight="100" />
```

In addition to the Fill attribute, gradients can also be used to fill the outline of an object, such as the Stroke of Shape elements.

A drawing brush makes it possible to fill a shape or control with combinations of other shapes and brushes. Shapes inside of a DrawingBrush, unlike normal Shape elements, are not elements in the element tree. Instead, they are parsed and rendered directly by the media layer. This can result in significantly improved performance in cases where the part of the user interface is composed of many shapes.

A drawing brush is a type of TileBrush. The section provides information about additional features the developer can use to control how a drawing brush fills its output area.

An ImageBrush fills an area with a bitmap image. The following sample shows how to use an ImageBrush to render an image as the background of a Canvas.

```
<Canvas Height="400" Width="600"
    xmlns="http://schemas.microsoft.com/2003/xaml" >
    <Canvas.Background>
        <ImageBrush
            Stretch="Uniform"
            HorizontalAlignment="Left"
            VerticalAlignment="Top"
            ImageSource="gecko.jpg" />
    </Canvas.Background>
</Canvas>
```

An image brush is a type of Tile Brush. The section provides information about additional features developers can use to control how an image fills its output area.

Both DrawingBrush and ImageBrush are types of tile brushes (they derive from the TileBrush class). Therefore, they have a common set of features that enable developers to control with great detail how an area is filled. For example, instead of just filling an area with a single stretched image, developers can fill an area with a series of image tiles that create a pattern.

A tile brush describes one or more tiles filled with content. An ImageBrush is a tile brush that fills its tiles with a bitmap image. A DrawingBrush is a tile brush that fills its tiles with a drawing.

Tile brushes provide the developer with two levels of control; developers can control how the brush's content fills its tiles, and the developer can control how the brush's tiles fill an area. By default, the tile brush fills the output area with a single tile, and the brush's content is stretched to fill that tile. Some of the properties that enable the developer to override this default behavior are the Stretch, ViewPort, and ViewBox properties. The Stretch property (also described below with reference to FIG. 18) defines how the brush's content fills its tiles. The ViewPort defines the size and position of a brush's tiles, and the ViewBox property determines the size and position of the brush's content.

The Stretch property controls how a tile brush's content is stretched to fill its tiles. The Stretch property accepts the following values, defined by the Stretch enumeration:
  None: The brush's content is not stretched to fill the tile.
  Fill: The brush's content is scaled to fit the tile. Because the content's height and width are scaled independently, the original aspect ratio of the content might not be preserved. That is, the brush's content might be warped in order to completely fill the output tile.
  Uniform: The brush's content is scaled so that it fits completely within the tile. The content's aspect ratio is preserved.
  UniformToFill: The brush's content is scaled so that it completely fills the output area while preserving the content's original aspect ratio.

The HorizontalAlignment and VerticalAlignment properties determine how a tile brush's content is aligned within its tiles. The HorizontalAlignment property accepts the following values, defined by the HorizontalAlignment enumeration: Left, Center, and Right. The VerticalAlignment property accepts the following values, defined by the VerticalAlignment enumeration: Top, Center, and Bottom.

The ViewPort property determines the size and position of a brush's tiles. The ViewPortUnits property determines whether the ViewPort is specified using absolute or relative coordinates. If the coordinates are relative, they are relative to the size of the output area. The point (0,0) represents the top left corner of the output area, and (1,1) represents the bottom right corner of the output area. To specify that the ViewPort property uses absolute coordinates, set the ViewPortUnits property to Absolute.

In the following example, an image is used to create a tile that has a width and height of 100, and with its top left corner at (0,0).

```
<Rectangle.Fill>
    <ImageBrush ViewPort="0,0 100,100"
ViewPortUnits="Absolute"
        ImageSource="help.gif" TileMode="Tile"/>
</Rectangle.Fill>
```

The size and position of the brush's content can be specified using the ViewBox property. When a tile brush's tile doesn't completely fill the output area, its TileMode property specifies how the remaining output area is filled. The TileMode property accepts the following values, defined by the TileMode enumeration:

None: Only the base tile is drawn.
Tile: The base tile is drawn and the remaining area is filled by repeating the base tile such that the right edge of one tile is adjacent to the left edge of the next, and similarly for bottom and top.
FlipX: The same as Tile, but alternate columns of tiles are flipped horizontally.
FlipY: The same as Tile, but alternate rows of tiles are flipped vertically.
FlipXY: A combination of FlipX and FlipY.
Different tiling modes are described below with reference to FIG. 19.

Figure 17:
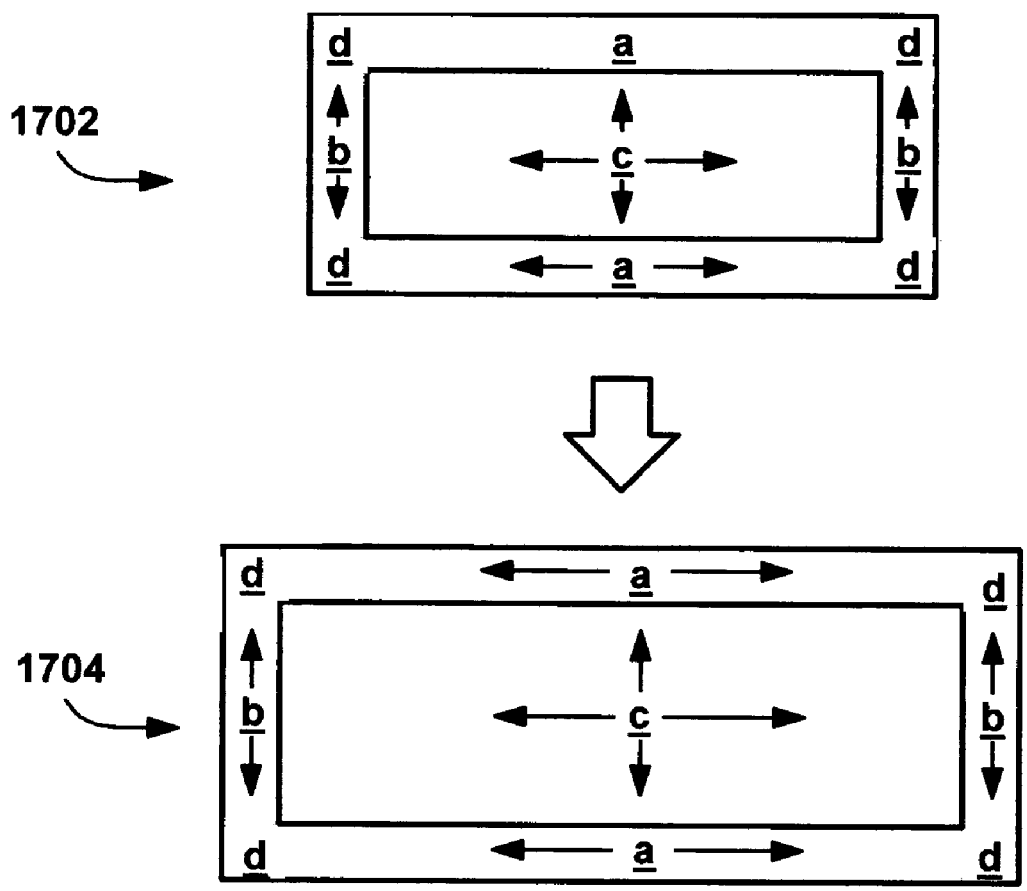
FIG. 17 is a representation of a rendered nine grid brush object in accordance with an aspect of the present invention.

A NineGridBrush, described below with reference to FIG. 17 is very similar to an image brush in that it fills an area with a bitmap image. With a NineGridBrush, however, the image is divided into nine regions or grids by four borders. For more information, see the NineGridBrush page.

Figure 3:
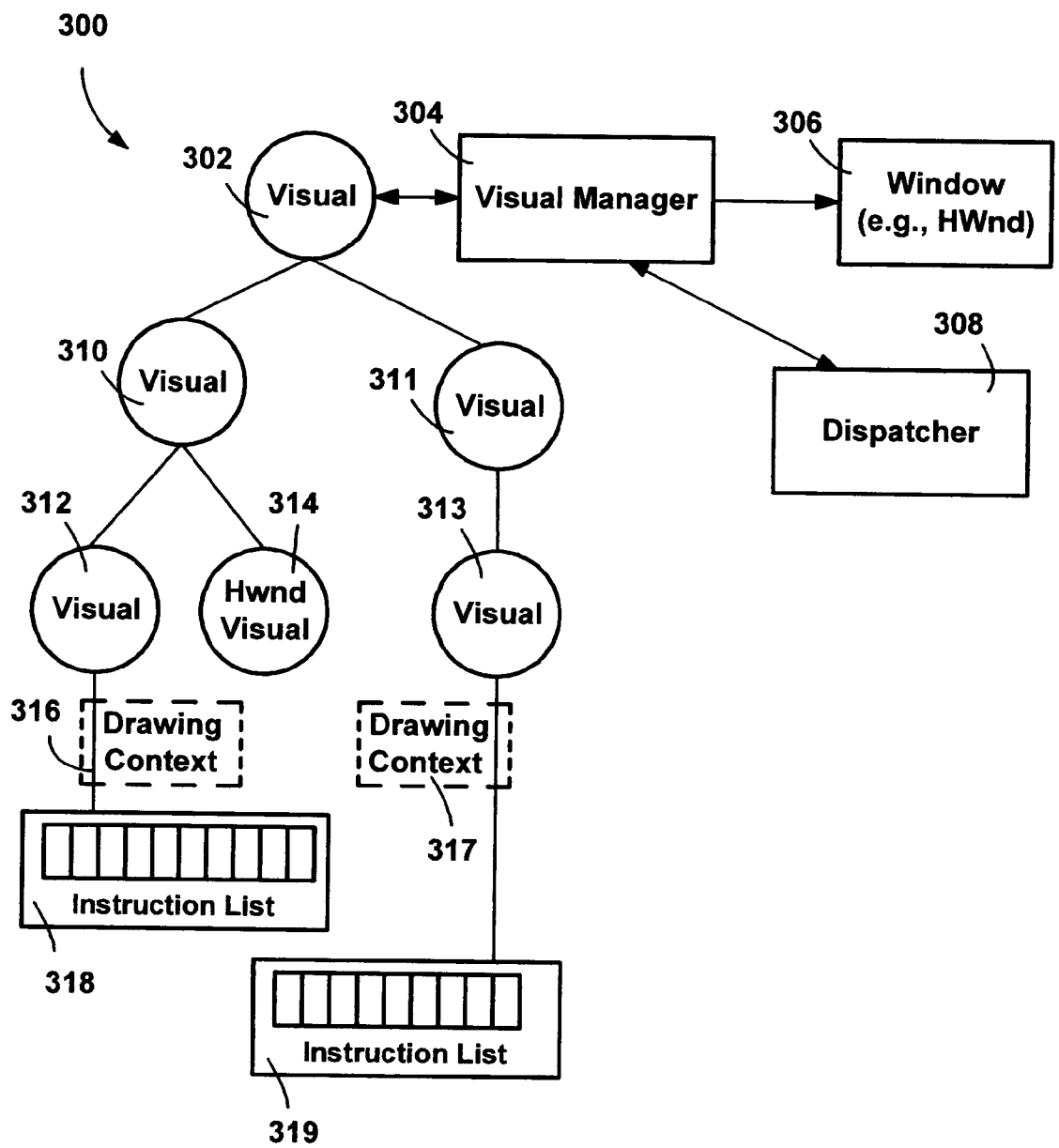
FIG. 3 is a representation of a scene graph of visuals and associated components for processing the scene graph such as by traversing the scene graph to provide graphics commands and other data in accordance with an aspect of the present invention.
Figure 4:
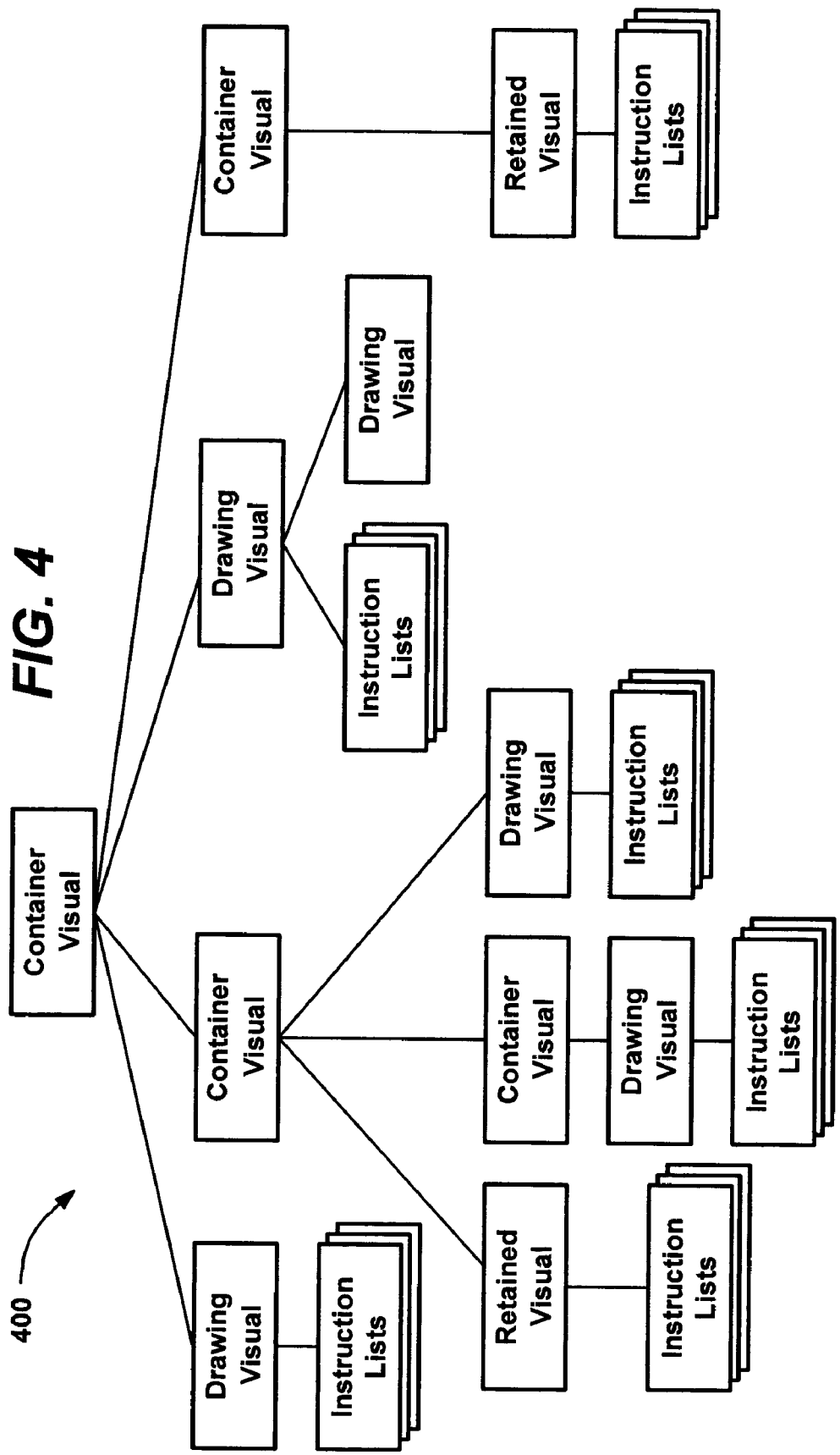
FIG. 4 is a representation of a scene graph of validation visuals, drawing visuals and associated Instruction Lists constructed in accordance with an aspect of the present invention.

FIGS. 3 and 4 show example scene graphs 300 and 400, respectively, including the base object referred to as a Visual. Visual Objects, or simply visuals, are containers for graphical content such as lines, text, and images. As represented in the object inheritance of the visual classes in FIG. 5, there are several different visual objects, including ContainerVisual, which is a Visual that does not directly contain graphical content, but contains child Drawing Visual objects. Child DrawingVisual objects are added to a ContainerVisual rather than to other DrawingVisual objects. This allows the developer to make changes and set properties on individual visual objects without recreating and then re-rendering the entire drawing context, while also allowing access to clipping and transform properties on the container object. ContainerVisual objects can be nested.

A DrawingVisual is a Visual that can contain graphical content. This Visual exposes a number of drawing methods. The child objects of a DrawingVisual are organized in a zero-based, z-order space. A RetainedVisual is A Visual that introduces a "retained instruction stream" that can be used for drawing. In simpler terms, the RetainedVisual allows the developer to retain the visual's content and redraw it only when necessary. It is possible to use the RetainedVisual imperatively, like a DrawingVisual, by calling RenderOpen and using the returned DrawingContext for drawing. The RetainedVisual provides validation callback functionality and an InvalidateVisual method. To use validation functionality, the user implements the IRetainedRender interface on the RetainedVisual or a class that derives from it.

Returning to FIG. 5, yet another visual is an HwndVisual 505, which is a Visual used to host a legacy Microsoft® Win32® control or window as a child visual inside a visual scene of a scene graph. More particularly, legacy programs will still operate via the WM_PAINT method (or the like) that draws to a child HWnd (or the like) based on prior graphics technology. To support such programs in the new graphics processing model, the HwndVisual allows the Hwnd to be contained in a scene graph and moved as the parent visual is repositioned. Other types of visuals are also feasible, such as three-dimensional (3D) visuals which enable a connection between two-dimensional and three dimensional worlds, e.g., a camera-like view is possible via a two-dimensional visual having a view into a three-dimensional world.

As shown in FIG. 3, a VisualManager 304 comprises an object that connects a visual tree to a medium. The VisualManager establishes a retained connection between the visual data structure (the root visual 302) and the target to which that data is rendered, offering the possibility of tracking differences between the two. The VisualManager 304 receives window messages and provides methods for transforming a point in drawing coordinates to device coordinates and vice versa.

A typical application might draw graphics by defining a layout in "XAML" as described in the aforementioned U.S. patent application Ser. No. 10/401,717, and also by specifying some drawing operations in C#. Developers may create Shape elements, or draw geometries using the Geometry classes with primitives. In the following scenario, the code demonstrates drawing an ellipse in the Visual that underlies the Canvas:

```
private void CreateAndShowMainWindow ( )
{
        mainWindow = new MSAvalon.Windows.Window ( );
        Canvas myCanvas = new Canvas( );
        mainWindow.Children.Add(myCanvas);
    Ellipse e1 = new Ellipse( );
    e1.Fill = Brushes.Blue;
    e1.Stroke = Brushes.Black;
    e1.StrokeThickness = new Length(10);
    e1.CenterX = new Length(100);
    e1.CenterY = new Length(75);
        e1.RadiusX = new Length(50);
            e1.RadiusY = new Length(50);
    myCanvas.Children.Add(e1);
    mainWindow.Show( );
    }
```

Using the Visual API, developers can instead draw directly into the Visual (that would otherwise be accessed via by the layout element).

To render the content of a DrawingVisual object, an application typically calls the RenderOpen method on the DrawingVisual. RenderOpen returns a DrawingContext with which the application can perform drawing operations. To clear the Visual's contents, the application calls Close on the DrawingContext. After the application calls Close, the DrawingContext can no longer be used.

The following code draws an ellipse (the same ellipse as in the previous example) into a DrawingVisual, using a Geometry object rather than the Ellipse shape. The example creates a DrawingVisual, gets the DrawingVisual's DrawingContext, and calls the DrawingContext's DrawGeometry method to draw the ellipse. Note that the developer needs to add the Visual to the visual tree of the top-level object, which in this case is the window.

```
    mainWindow = new MSAvalon.Windows.Window( );
        mainWindow.Show( );
            DrawingVisual myDrawingVisual = new
DrawingVisual( );
        DrawingContext myDrawingContext =
myDrawingVisual.RenderOpen( );
            SolidColorBrush mySolidColorBrush = new
SolidColorBrush( );
        mySolidColorBrush.Color = Colors.Blue;
        Pen myPen = new Pen(Brushes.Black, 10);
        EllipseGeometry aGeometry = new EllipseGeometry(new
Point (100,75), 50, 50);
        myDrawingContext.DrawGeometry(mySolidColorBrush,
myPen, aGeometry);
        myDrawingContext.Close( );
        ((IVisual)mainWindow).Children.Add(myDrawingVisual)
```

The following example further builds on the previous example by adding similar ellipses to a ContainerVisual; note that this example is verbose for clarity). Using ContainerVisual can help organize scene objects and allow the developer to segregate Visual objects on which to perform hit-testing or validation (RetainedVisual objects) from ordinary drawn content, and minimize unnecessary redrawing of content.

```
        mainWindow = new MSAvalon.Windows.Window( );
        mainWindow.Show( );
//Create some Visuals
        ContainerVisual myContainer = new ContainerVisual( );
        DrawingVisual myDrawingVisual = new DrawingVisual( );
        DrawingVisual myDrawingVisual__1 = new DrawingVisual( );
        DrawingVisual myDrawingVisual__2 = new DrawingVisual( );
//Perform some drawing
        DrawingContext myDrawingContext =
myDrawingVisual.RenderOpen( );
        SolidColorBrush mySolidColorBrush = new SolidColorBrush( );
        mySolidColorBrush.Color = Colors.Violet;
        Pen myPen = new Pen(Brushes.Black, 10);
        EllipseGeometry aGeometry = new EllipseGeometry(new
Point (100,75), 50, 50);
        myDrawingContext.DrawGeometry(mySolidColorBrush, myPen,
aGeometry);
        myDrawingContext.Close( );
        DrawingContext myDrawingContext__1 =
myDrawingVisual__1.RenderOpen( );
        mySolidColorBrush.Color = Colors.Red;
        Pen myPen1 = new Pen(Brushes.Orange, 10);
        EllipseGeometry aGeometry1 = new EllipseGeometry(new
Point (100,175), 50, 50);
        myDrawingContext__1.DrawGeometry(mySolidColorBrush, myPen1,
aGeometry1);
        myDrawingContext__1.Close( );
        DrawingContext myDrawingContext__2 =
myDrawingVisual__2.RenderOpen( );
        mySolidColorBrush.Color = Colors.Yellow;
        Pen myPen2 = new Pen(Brushes.Blue, 10);
        EllipseGeometry aGeometry2 = new EllipseGeometry(new
Point (100,275), 50, 50);
        myDrawingContext__2.DrawGeometry(mySolidColorBrush, myPen2,
aGeometry2);
        myDrawingContext__2.Close( );
//Add DrawingVisuals to the ContainerVisual's VisualCollection
        myContainer.Children.Add(myDrawingVisual);
        myContainer.Children.Add(myDrawingVisual__1);
        myContainer.Children.Add(myDrawingVisual__2);
//Add the ContainerVisual to the window
        ((IVisual)mainWindow).Children.Add(myContainer);
```

A RetainedVisual is similar to a DrawingVisual, but allows for selective redrawing of visual content. As its name suggests, the RetainedVisual can retain content for multiple appearances on the medium. It also provides callback and validation functionality. This functionality can help with rendering performance by offering the developer greater control over re-rendering of content.

At a basic level, the user can create and use a RetainedVisual much like a DrawingVisual; that is, the user can call RenderOpen and get a DrawingContext. Alternatively, the user can implement the IRetainedRender interface on a RetainedVisual. By doing so, users ensure that the graphics system will use the value set in the RenderBounds property as the bounds for the content to be rendered at the IRetainedVisual.Render call.

When rendering the scene, the graphics system will examine any child Visual. If the value of the RenderBounds property indicates that a particular Visual's content will be needed in rendering a scene, the system will call IRetainedVisual.Render to fill the content of the Visual, replacing any content already in memory. The application can also call InvalidateVisual directly to flush content from a Visual. If the application has not implemented IRetainedRender on the RetainedVisual, any call to InvalidateVisual will throw an exception.

The following code instantiates a class that implements IRetainedRender on a RetainedVisual and draws into it.

```
public class Rectangle : RetainedVisual, IRetainedRender
        {
                public Rectangle(Color color, Rect rect) :
        base( )
                {
                        m__color = color;
                        m__rect = rect;
                        RenderBounds = rect;
                }
                public void SetColor(Color color)
                {
                        m__color = color;
                        InvalidateVisual( );
                }
                public void Render(DrawingContext ctx)
                {
                        ctx.DrawRectangle(
                                new SolidColorBrush(m__color),
                                null,
                                m__rect);
                }
        }
```

The Visual API, like the rest of the graphics system of the present invention, is a managed API and makes use of typical features of managed code, including strong typing and garbage collection. It also takes advantage of the hardware acceleration capability for rendering. To accommodate developers working with existing unmanaged applications, the Visual API provides limited interoperability between the present graphics system and Microsoft Windows® Graphics Device Interface (GDI)-based rendering services.

This interoperability allows developers to host GDI-based windows in Visual-aware applications using the HwndVisual object, write controls and theming that are based on the present invention's drawing and rendering, but still work in legacy GDI applications, and Modify GDI HWND-based applications to take advantage of the new rendering features, including hardware acceleration and the color model.

Figure 5:
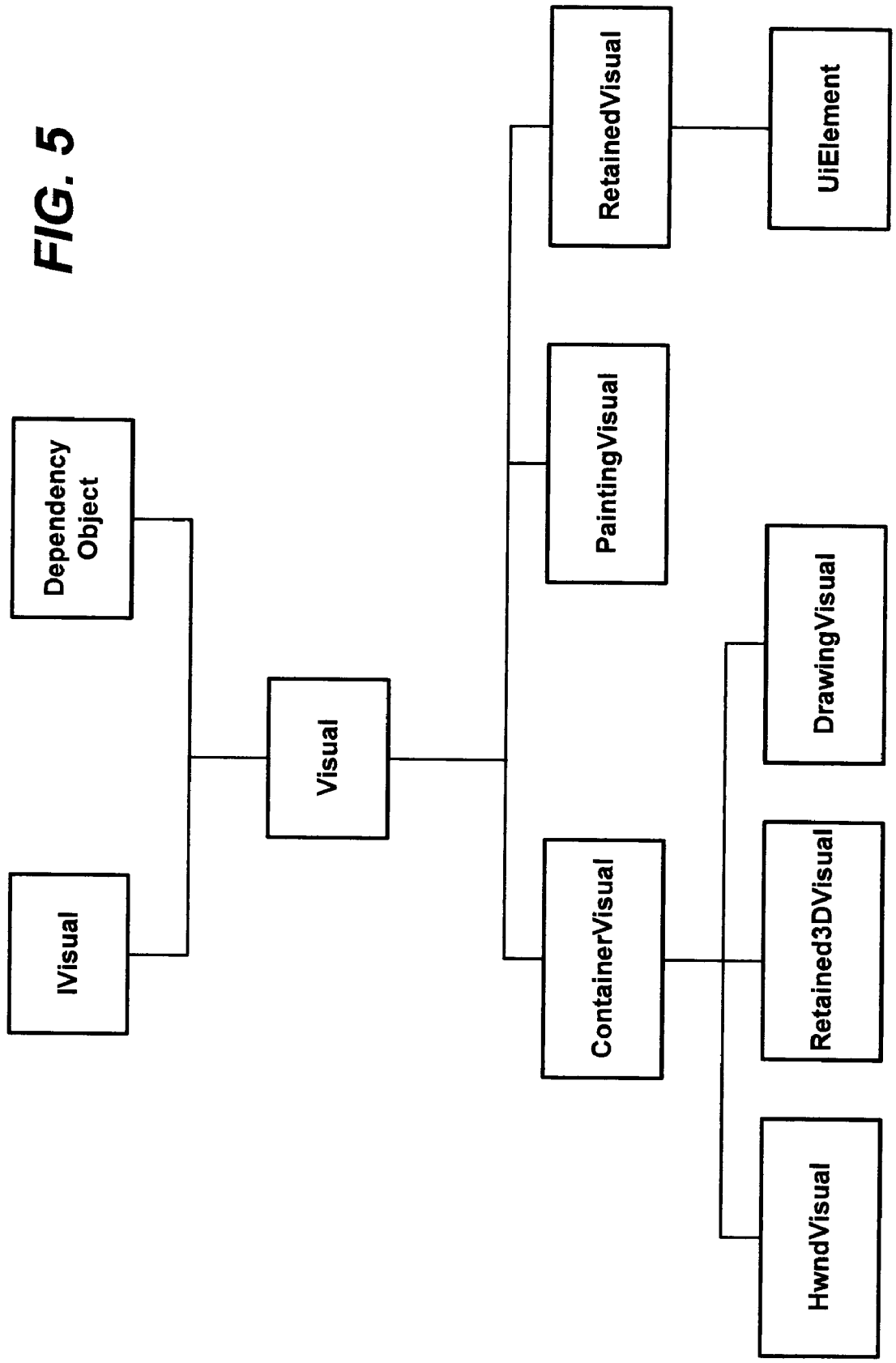
FIG. 5 is a representation of a visual class, of an object model, in accordance with an aspect of the present invention.

The HwndVisual enables hosting of Win32 content in a Visual-aware application. As represented in FIG. 5, HwndVisual inherits from ContainerVisual. Note that it is not possible to mix GDI and the new drawing models in the same HwndVisual. Instead, this visual might be more useful for legacy controls of limited scope. The following example demonstrates creating a control in an HwndVisual and adding it to the visual tree.

```
//Import Win32 resources and define variables for a control.
.
.
.
.
//Create the control.
hwndControl = CreateWindowEx(
0,
WC_TREEVIEW,
" ",
WS_CHILD | WS_VISIBLE | TVS_HASLINES |
TVS_LINESATROOT |
TVS_HASBUTTONS,
x,
y,
cx,
cy,
hwndParent,
IntPtr.Zero,
IntPtr.Zero,
0);
//Create an HwndVisual for the control and add it to a
previously-defined
//collection.
s_visual1 = HwndVisual.GetHwndVisual(hwndControl);
s_visual1.Size = new Size (150, 150);
s_visual1.IsHwndDpiAware = false;
s_visual0.Children.Add(s_visual1);
```

As with other objects, the developer can apply transforms and other property changes to the control once hosted in a Visual.

```
TransformCollection t = new TransformCollection( );
t.AddScale(1.4, 1.4);
t.AddTranslate(130, 80);
s_visual0.Children.SetTransform(s_visual1, t);
```

Figure 6:
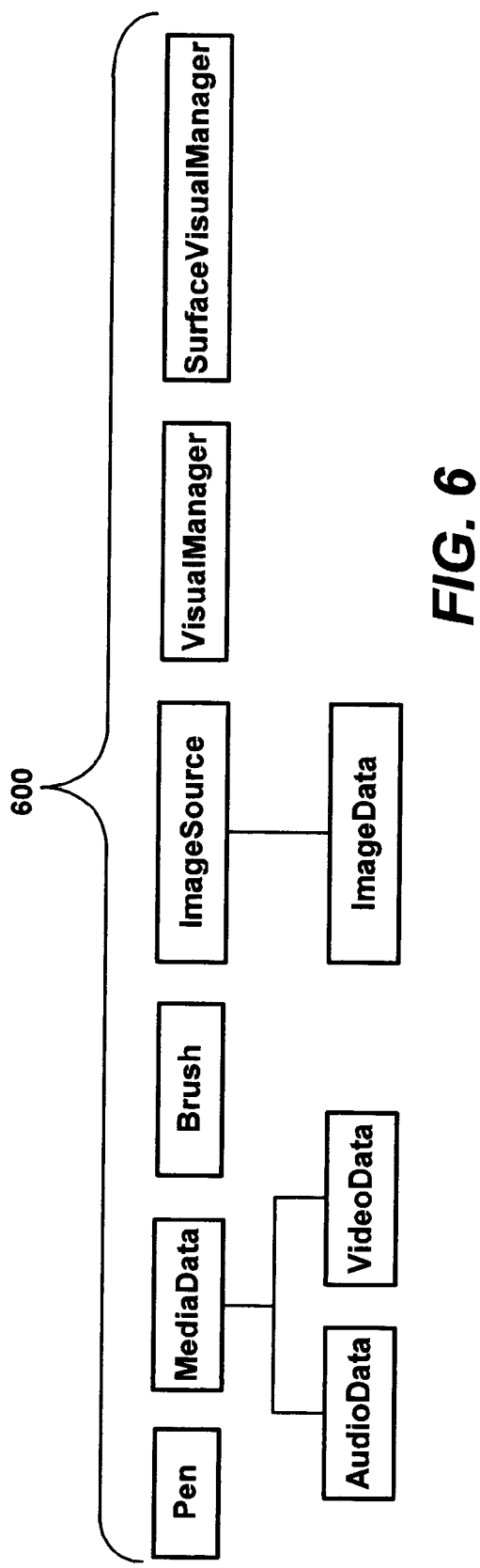
FIG. 6 is a representation of various other objects of the object model, in accordance with an aspect of the present invention.

As represented in FIG. 3, a top-level (or root) Visual 302 is connected to a Visual manager object 304, which also has a relationship (e.g., via a handle) with a window (HWnd) 306 or similar unit in which graphic data is output for the program code. The VisualManager 304 manages the drawing of the top-level Visual (and any children of that Visual) to that window 306. FIG. 6 shows the VisualManager as one of a set of objects 600 in the object model of the graphics system described herein.

To draw, the Visual manager 304 processes (e.g., traverses or transmits) the scene graph as scheduled by a dispatcher 308, and provides graphics instructions and other data to the low level component 218 (FIG. 2) for its corresponding window 306, such as generally described in the aforementioned U.S. Patent Applications. The scene graph processing will ordinarily be scheduled by the dispatcher 308 at a rate that is relatively slower than the refresh rate of the lower-level component 218 and/or graphics subsystem 222.

FIG. 3 shows a number of child Visuals 310-314 arranged hierarchically below the top-level (root) Visual 302, some of which are represented as having been populated via drawing contexts 316, 317 (shown as dashed boxes to represent their temporary nature) with associated instruction lists 318 and 319, respectively, e.g., containing Instruction Lists and other Visuals. The Visuals may also contain other property information. In general, most access on the base visual class comes via an IVisual interface, and visual derives from DependencyObject, as represented in FIG. 5. Among other drawing primitives, the instruction list may include a reference to an ImageData. That ImageData can then be changed/updated directly by getting a drawing context off of it, or by having a SurfaceVisualRenderer (alternatively named ImageDataVisualRenderer).

Visuals offer services by providing clip, opacity and possibly other properties that can be set, and/or read via a get method. In addition, the visual has flags controlling how it participates in hit testing. A Show property is used to show/hide the visual, e.g., when false the visual is invisible, otherwise the visual is visible. Furthermore, these objects (whether Visuals at the Visual API layer or elements at the element layer) exist in a hierarchy. A coordinate system is inherited down through this hierarchy. In this way, a parent can push a coordinate transform that modifies the rendering pass and gets applied to that parent's children.

The transform for a visual is on the connection to that visual. In other words, it is set via the [Get|Set]ChildTransform on the parent's IVisual interface.

Figure 8:
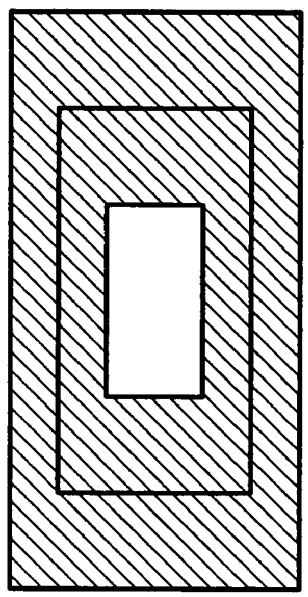
FIGS. 8 and 9 are representations of transformations of a visual's data in a geometry scale and a non-uniform scale, respectively, in accordance with an aspect of the present invention.
Figure 8:
Figure 8:
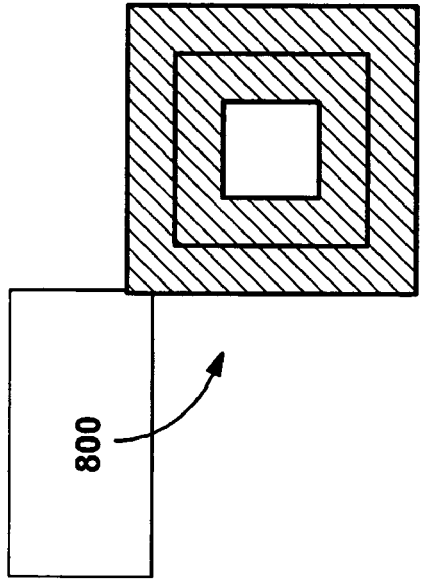
Figure 9:
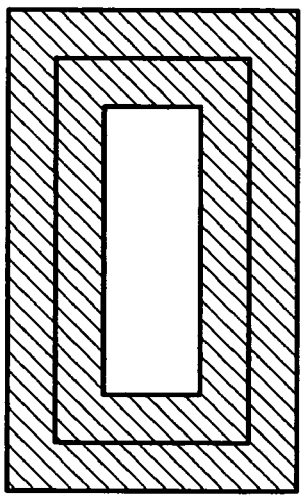
Figure 9:
Figure 9:
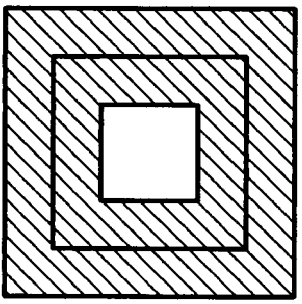

Note that the coordinate transforms may be applied in a uniform way to everything, as if it were in a bitmap. Note that this does not mean that transformations always apply to bitmaps, but that what gets rendered is affected by transforms equally. By way of example, if the user draws a circle with a round pen that is one inch wide and then applies a scale in the X direction of two to that circle, the pen will be two inches wide at the left and right and only one inch wide at the top and bottom. This is sometimes referred to as a compositing or bitmap transform (as opposed to a skeleton or geometry scale that affects the geometry only). FIG. 8 is a representation of scaling transformation, with a non-transformed image 800 appearing on the left and a transformed image 802 with a non-uniform scale appearing on the right. FIG. 9 is a representation of scaling transformation, with the non-transformed image 800 appearing on the left and a transformed image 904 with geometry scaling appearing on the right.

With respect to coordinate transformation of a visual, TransformToDescendant transforms a point from the reference visual to a descendant visual. The point is transformed from the post-transformation coordinate space of the reference visual to the post-transformation coordinate space of the descendant visual. TransformFromDescendant transforms a point from the descendant visual up the parent chain to the reference visual. The point is transformed from post-transformation coordinate space of the descendant visual to post-transformation coordinate space of the reference visual. A user may get a Matrix to and from a descendant and from and to any arbitrary visual. Two properties are available that may be used to determine the bounding box of the content of the Visual, namely DescendantBounds, which is the bounding box of the descendants, and ContentBounds which is the bounds of the content. Applying a Union to these provides the total bounds.

Figure 10:
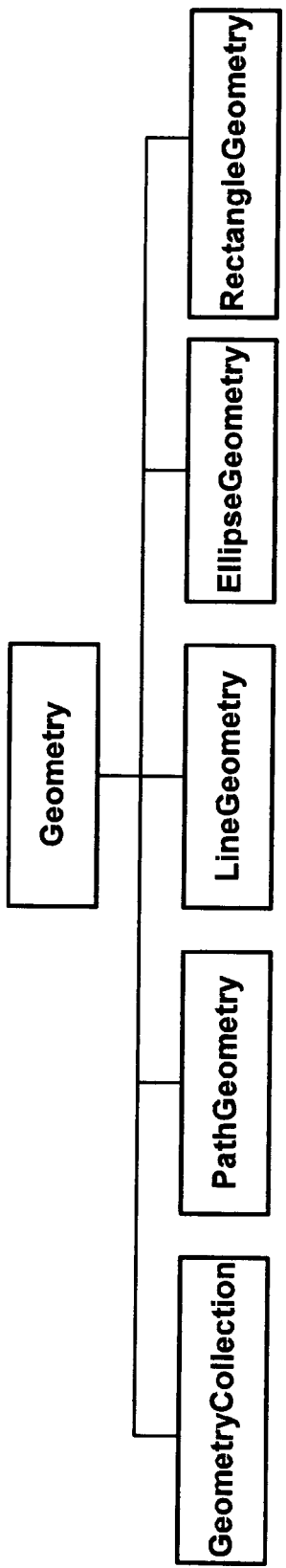
FIG. 10 is a representation of geometry classes of the object model, in accordance with an aspect of the present invention.

The clip property sets (and gets) the clipping region of a visual. Any Geometry (the geometry class is shown in FIG. 10) can be used as a clipping region, and the clipping region is applied in Post-Transformation coordinate space. In one implementation, a default setting for the clipping region is null, i.e., no clipping, which can be thought of as an infinite big clipping rectangle from $(-\infty, -\infty)$ to $(+\infty, +\infty)$.

The Opacity property gets/sets the opacity value of the visual, such that the content of the visual is blended on the drawing surface based on the opacity value and the selected blending mode. The BlendMode property can be used to set (or get) the blending mode that is used. For example, an opacity (alpha) value may be set between 0.0 and 1.0, with linear alpha blending set as the mode, e.g., Color=alpha*foreground color+(1.0-alpha)*background color). Other services, such as special effects properties, may be included in a visual, e.g., blur, monochrome, and so on.

The various services (including transform, opacity, and clip) can be pushed and popped on a drawing context, and push/pop operations can be nested, as long as there is an appropriate pop call for each push call.

The PushTransform method pushes a transformation. Subsequent drawing operations are executed with respect to the pushed transformation. The pop call pops the transformation pushed by the matching PushTransform call:

void PushTransform(Transform transform);
    void PushTransform(Matrix matrix);
    void Pop( );.

Similarly, the PushOpacity method pushes an opacity value. Subsequent drawing operations are rendered on a temporary surface with the specified opacity value and then composite into the scene. Pop( ) pops the opacity pushed by the matching PushOpacity call:

void PushOpacity(float opacity);
    void PushOpacity(FloatAnimation opacity);
    void Pop( );.

The PushClip method pushes a clipping geometry. Subsequent drawing operations are clipped to the geometry. The clipping is applied in post transformation space. Pop( ) pops the clipping region pushed by the matching PushClip call:

void PushClip(Geometry clip);
    void Popo;.

Note that push operations can be arbitrarily nested as long as the pop operations are matched with a push. For example, the following is valid:

```
PushTransform(...);
DrawLine(...);
PushClip(...);
DrawLine(...);
Pop( );
PushTransform(...);
DrawRect(...);
Pop( );
Pop( );
```

A ProxyVisual is a visual that may be added more than once into the scene graph, e.g., below a container visual. Since any visual referred to by a ProxyVisual may be reached by multiple paths from the root, read services (TransformToDescendent, TransformFromDescendent and HitTest) do not work through a ProxyVisual. In essence, there is one canonical path from any visual to the root of the visual tree and that path does not include any ProxyVisuals.

FIG. 4 shows an example scene graph 400 in which ContainerVisuals and DrawingVisuals (and others) are related in a scene graph, and have associated data in the form of Instruction Lists, (e.g., in corresponding drawing contexts). The ContainerVisual is a container for Visuals, and ContainerVisuals can be nested into each other. The children of a ContainerVisual can be manipulated can be manipulated with via methods on the IVisual interface that the ContainerVisual implements. The order of the Visuals in the VisualCollection determines in which order the Visuals are rendered, i.e. Visuals are rendered from the lowest index to the highest index from back to front (painting order).

As described above, visuals can be drawn on by populating their drawing contexts with various drawing primitives, including Geometry, ImageSource and MediaData. Furthermore, there are a set of resources and classes that are shared through this entire stack. This includes Pens, Brushes, Geometry, Transforms and Effects. The DrawingContext abstract class exposes a set of drawing operations that can be used to populate a DrawingVisual, ValidationVisual, ImageData, etc. In other words, the drawing context abstract class exposes a set of drawing operations; for each drawing operation there are two methods, one that takes constants as arguments, and one that takes animators as arguments.

Geometry is a type of class (FIG. 10) that defines a vector graphics skeleton, without stroke or fill. Each geometry object is a simple shape (LineGeometry, EllipseGeometry, RectangleGeometry), a complex single shape (PathGeometry) or a list of such shapes GeometryCollection with a combine operation (e.g., union, intersection, and so forth) specified. These objects form a class hierarchy as represented in FIG. 10.

Figure 11:
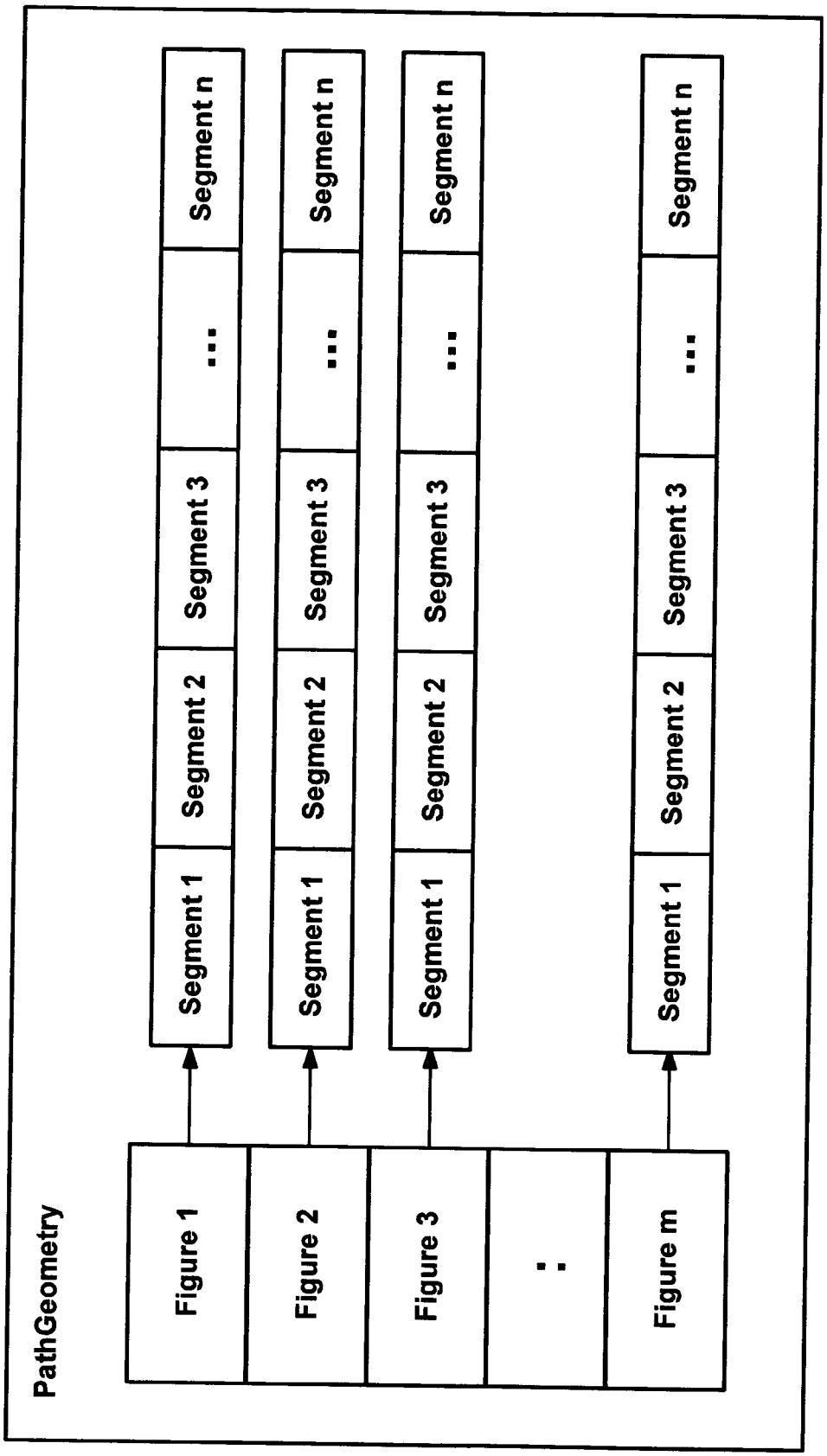
FIG. 11 is a representation of a PathGeometry structure, in accordance with an aspect of the present invention.

As represented in FIG. 11, the PathGeometry is a collection of Figure objects. In turn, each of the Figure objects is composed of one or more Segment objects which actually define the figure's shape. A Figure is a sub-section of a Geometry that defines a segment collection. This segment collection is a single connected series of two-dimensional Segment objects. The Figure can be either a closed shape with a defined area, or just a connected series of Segments that define a curve, but no enclosed area.

Figure 12:
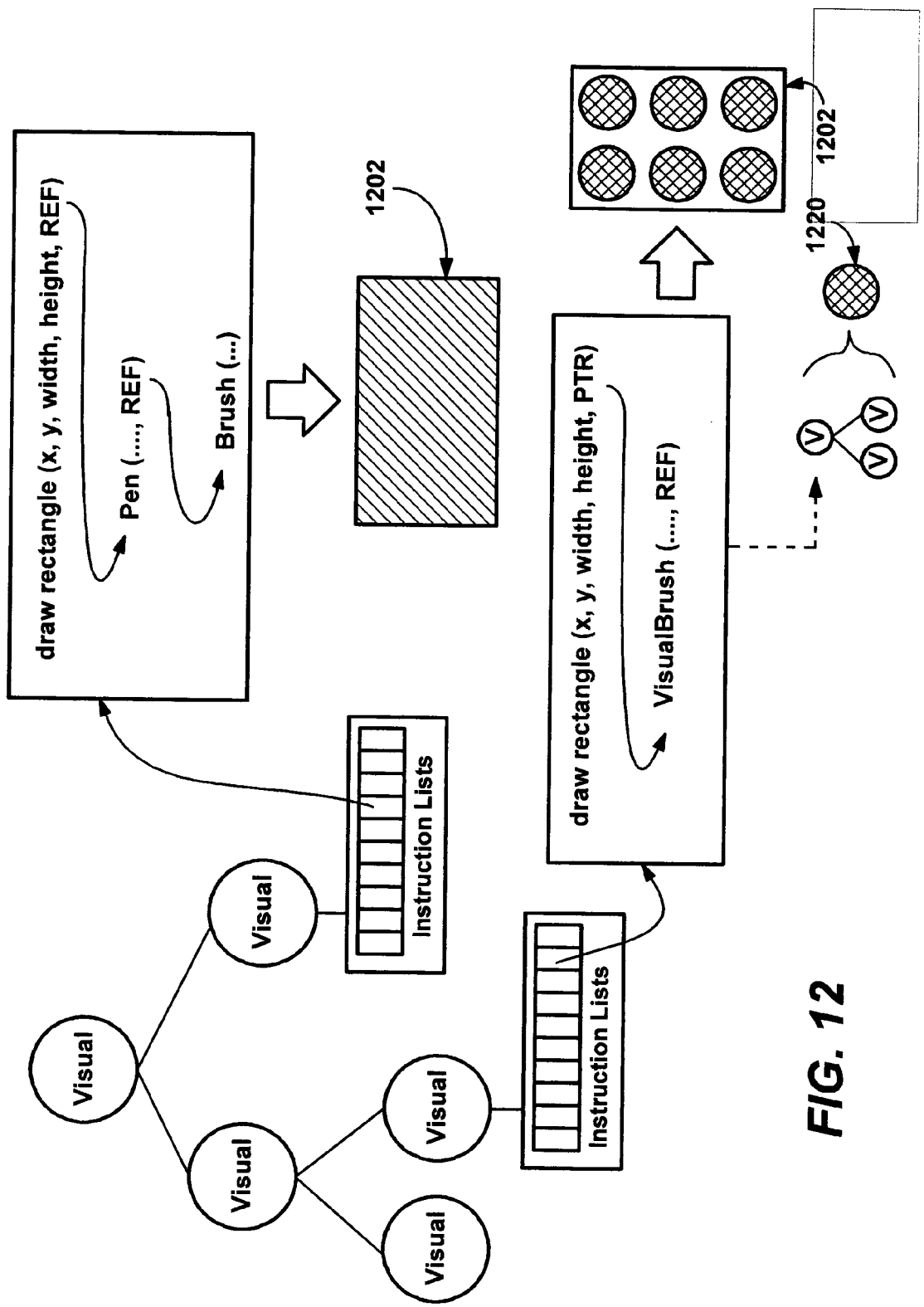
FIG. 12 is a representation of a scene graph of visuals and Instruction Lists showing example graphics produced by the primitives, in accordance with an aspect of the present invention.

As represented in FIG. 12, when geometry (e.g., a rectangle) is drawn, a brush or pen can be specified, as described below. Furthermore, the pen object also has a brush object. A brush object defines how to graphically fill a plane, and there is a class hierarchy of brush objects. This is represented in FIG. 12 by the filled rectangle 1202 that results when the visual including the rectangle and brush instructions and parameters is processed. A Pen object holds onto a Brush along with properties for Width, LineJoin, LineCap, MiterLimit, DashArray and DashOffset, as described below. As also described below, some types of Brushes (such as gradients and nine grids) size themselves. When used, the size for these brushes is obtained from the bounding box, e.g., when the GradientUnits/DestinationUnits for the Brush is set to RelativeToBoundingBox, the bounding box of the primitive that is being drawn is used. If those properties are set to Absolute, then the coordinate space is used.

Figure 13:
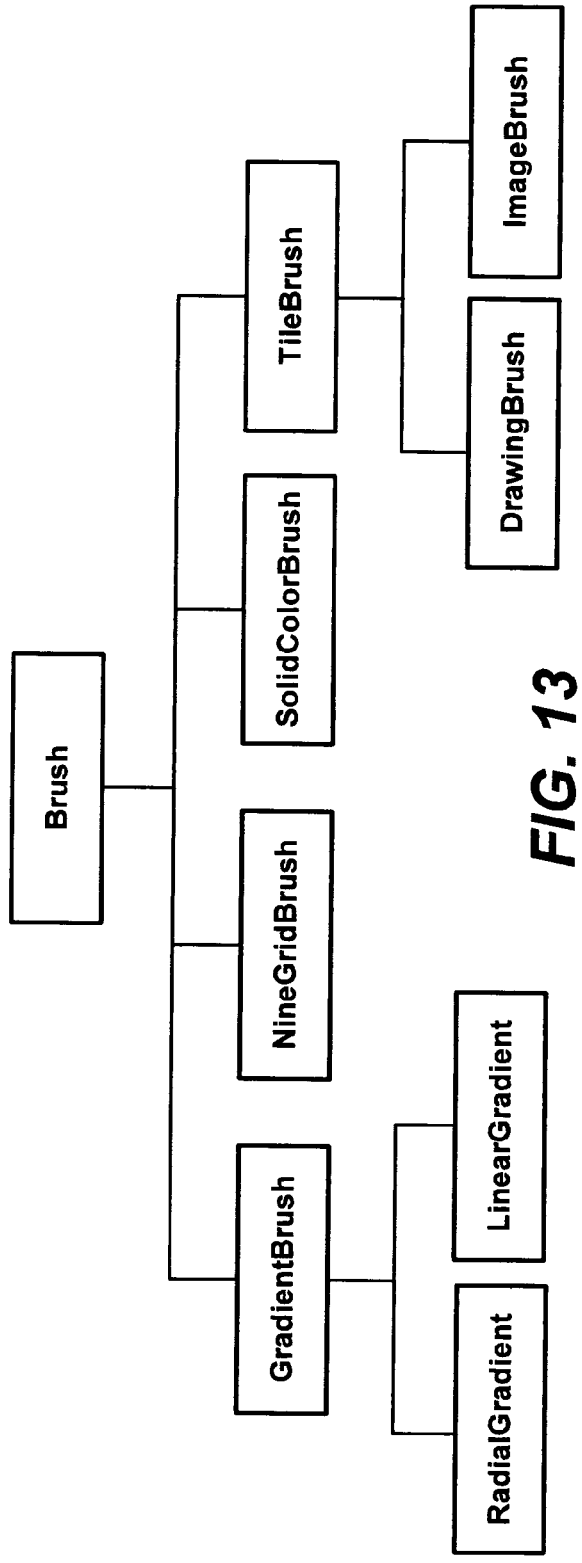
FIG. 13 is a representation of brush classes of the object model, in accordance with an aspect of the present invention.

The graphics object model of the present invention includes a Brush object model, which is generally directed towards the concept of covering a plane with pixels. Examples of types of brushes are represented in the hierarchy of FIG. 13, and, under a Brush base class, include Gradient Brush, NineGridBrush, SolidColorBrush and TileBrush. GradientBrush includes LinearGradient and RadialGradient objects. DrawingBrush and ImageBrush derive from TileBrush. Alternative arrangements of the classes are feasible, e.g., deriving from TileBrush may be ImageBrush, VisualBrush, VideoBrush, NineGridBrush and Drawing Brush. Note that Brush objects may recognize how they relate to the coordinate system when they are used, and/or how they relate to the bounding box of the shape on which they are used. In general, information such as size may be inferred from the object on which the brush is drawn. More particularly, many of the brush types use a coordinate system for specifying some of their parameters. This coordinate system can either be defined as relative to the simple bounding box of the shape to which the brush is applied, or it can be relative to the coordinate space that is active at the time that the brush is used. These are known, respectively, as RelativeToBoundingBox mode and Absolute mode.

A SolidColorBrush object fills the identified plane with a solid color. If there is an alpha component of the color, it is combined in a multiplicative way with the corresponding opacity attribute in the Brush base class. The following sets forth an example SolidColorBrush object:

```
public sealed class System.Windows.Media.SolidColorBrush : Brush
{
    // Constructors
    public SolidColorBrush( ); // initialize to black
    public SolidColorBrush(Color color);
    public SolidColorBrush(System.Windows.Media.Animation.ColorComposer
        colorComposer);
    // Properties
    public Color Color { get; }
    public IEnumerator ColorAnimations { get; }
}
public class System.Windows.Media.SolidColorBrushBuilder : BrushBuilder
{
    // Constructors
    public SolidColorBrushBuilder( );
    public SolidColorBrushBuilder(Color color);
    public SolidColorBrushBuilder(SolidColorBrush scp);
    // Properties
    public Color Color { get; set; }
    public AnimationList ColorAnimations { get; }
    // Methods
    public virtual Brush ToBrush( );
}
```

The GradientBrush objects, or simply gradients, provide a gradient fill, and are drawn by specifying a set of gradient stops, which specify the colors along some sort of progression. The gradient is by drawn by performing linear interpolations between the gradient stops in a gamma 2.2 RGB color space; interpolation through other gammas or other color spaces (HSB, CMYK and so forth, is also a feasible alternative. Two types of gradient objects include linear and radial gradients.

In general, gradients are composed of a list of gradient stops. Each of these gradient stops contains a color (with the included alpha value) and an offset. If there are no gradient stops specified, the brush is drawn as a solid transparent black, as if there were no brush specified at all. If there is only one gradient stop specified, the brush is drawn as a solid color with the one color specified. Like other resource classes, the gradient stop class (example in the table below) is derives from the changeable class and thus is selectively mutable, as described in the United States Patent Application entitled "Changeable Class and Pattern to Provide Selective Mutability in Computer Programming Environments."

Gradients are drawn by specifying a set of gradient stops. These gradient stops specify the colors along some sort of progression. There are two types of gradients presently supported, namely linear and radial gradients. The gradient is drawn by doing interpolations between the gradient stops in the specified color space.

Gradients are composed of a list of gradient stops. Each of these gradient stops contains a color (with the included alpha value) and an offset. If there are no gradient stops specified, the brush is drawn as transparent (as if there were no brush specified). If there is only one gradient stop specified, the brush is drawn as a solid color with the one color specified. Any gradient stops with offsets in the range of zero to one (0.0 . . . 1.0) are considered, with the largest stop in the range (−∞ . . . 0.0] and the smallest stop in the range [1.0 . . . +∞). If the set of stops being considered includes a stop which is outside of the range zero to one, an implicit stop is derived at zero (and/or one) which represents the interpolated color which would occur at this stop. Also, if two or more stops are set at the same offset, a hard transition (rather than interpolated) occurs at that offset. The order in which stops are added determines the behavior at this offset; the first stop to be added is the effective color before that offset, the last stop to be set is the effective color after this stop, and any additional stops at this offset are ignored.

This class is a Changeable like other resource classes:

```
public sealed class System.Windows.Media.GradientStop :
    Changeable
{
    public GradientStop( );       public GradientStop(Color color,
        double offset);
    public GradientStop(Color color, ColorAnimationCollection
        colorAnimations,
            double offset,
        DoubleAnimationCollection offsetAnimations);
    public new GradientStop Copy( ); // hides Changeable.Copy( )
    // Default is transparent
    [Animation("ColorAnimations")]
    public Color Color { get; set; }
    public ColorAnimationCollection ColorAnimations { get; set;
    }
    // Default is 0
    [Animation("OffsetAnimations")]
    public double Offset { get; set; }
    public DoubleAnimationCollection OffsetAnimations { get;
        set; }
}
```

Like SolidColorBrush, this has nested Changeables in the animation collections.

The GradientSpreadMethod enum specifies how the gradient should be drawn outside of the specified vector or space. There are three possible values, including Pad, in which the end colors (first and last) are used to fill the remaining space, Reflect, in which the stops are replayed in reverse order repeatedly to fill the space, and Repeat, in which the stops are repeated in order until the space is filled. The default value for properties of this type is Pad:

```
public enum System.Windows.Media.GradientSpreadMethod
{
    Pad,
    Reflect,
    Repeat
}
```

Figure 14:
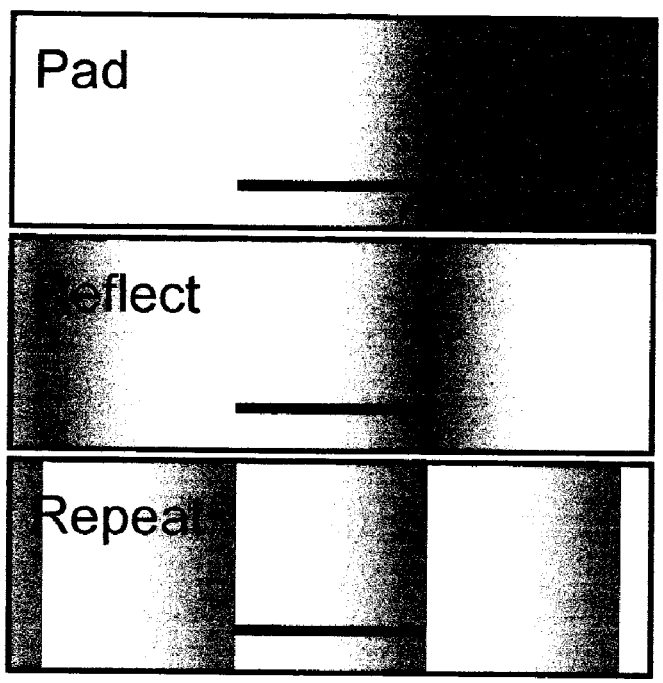
FIGS. 14 and 15 are representations of rendered graphics resulting from data in a linear gradient brush object, in accordance with an aspect of the present invention.
Figure 15:

FIGS. 14 and 15 provide some GradientSpreadMethod examples, (albeit in grayscale rather than in color). Each shape has a linear gradient going from white to grey. The solid line represents the gradient vector.

In general, a LinearGradientBrush is used to fill an area with a linear gradient. A linear gradient defines a gradient along a line, The line's end point is defined by the linear gradient's StartPoint and EndPoint properties. By default, the StartPoint of a linear gradient is (0,0), the upper-left corner of the area being filled, and its EndPoint is (1,1), the bottom-right corner of the area being filled. As represented in FIG. 15, using the default values, the colors in the resulting gradient are interpolated along a diagonal path. The black line formed from the start and end points of the gradient has been added herein to highlight the gradient's interpolation path.

The ColorInterpolationMode enum defines the interpolation mode for colors within a gradient. The two options are PhysicallyLinearGamma10 and PerceptuallyLinearGamma22.

```
public enum ColorInterpolationMode
{
    // Colors are interpolated in Gamma 1.0 space
    PhysicallyLinearGamma10,
    // Colors are interpolated in Gamma 2.2 space
    PerceptuallyLinearGamma22
}
```

This is an abstract base class.

```
public abstract class System.Windows.Media.GradientBrush :
        Brush
{
    internal GradientBrush( );
    public new GradientBrush Copy( ); // hides
        Changeable.Copy( )
    // Default is "PerceptuallyLinearGamma22"
    public ColorInterpolationMode ColorInterpolationMode { get;
        set; }
    // Default is RelativeToBoundingBox
    public BrushMappingMode MappingMode { get; set; }
    // Default is Pad
    public GradientSpreadMethod SpreadMethod { get; set; }
    // Gradient Stops
    public void AddStop(Color color, double offset);
    public GradientStopCollection GradientStops { get; set; }
    // ColorInterpolationMode
    public ColorInterpolationMode ColorInterpolationMode { get;
        set; }
}
```

As described above in the Changeables section, GradientBrush is a complex-type with respect to Changeables, because its GradientStops property itself holds Changeables. That means that GradientBrush needs to implement the protected methods MakeUnchangeableCore( ), and PropagateEventHandler( ), as well as CloneCore( ) that Changeable subclasses implement. It may also choose to implement ValidateObjectState( ) if there are invalid combinations of GradientStops that make up the collection, for instance.

The LinearGradient specifies a linear gradient brush along a vector. The individual stops specify colors stops along that vector.

```
public sealed class System.Windows.Media.LinearGradient :
        GradientBrush
{
    public LinearGradient( );   // initializes to transparent
    // Sets up a gradient with two colors and a gradient
vector
    // specified to fill the object the gradient is applied
to.
    // This implies RelativeToBoundingBox for the
GradientUnits
    // property
    public LinearGradient(Color color1, Color color2, double
angle);
    public LinearGradient (Color color1, Color color2,
        Point vectorStart, Point vectorEnd);
    public new LinearGradient Copy( );   // hides
Changeable.Copy( )
    // Gradient Vector Start Point
    // Default is 0,0
    [Animation("StartPointAnimations")]
    public Point StartPoint { get; set; }
    public PointAnimationCollection StartPointAnimations {
get; set; }
    // Default is 1,1
    [Animation("EndPointAnimations")]
    public Point EndPoint { get; set; }
    public PointAnimationCollection EndPointAnimations { get;
set; }
}
linear-gradient-brush:
    "HorizontalGradient" comma-wsp color comma-wsp color |
    "VerticalGradient" comma-wsp color comma-wsp color |
    "LinearGradient" comma-wsp coordinate-pair comma-wsp
color comma-wsp color
```

The markup for LinearGradient allows specification of a LinearGradient with two color stops, at offsets zero and one. If the "LinearGradient" version is used, the start point and end point are specified, respectively. If "HorizontalGradient" is used, the start point is set to 0,0 and the end point is set to 1,0. If "VerticalGradient" is used, the start point is set to 0,0 and the end point is set to 0,1. In these cases, the default MappingMode is used, which is RelativeToBoundingBox.

Figure 16:
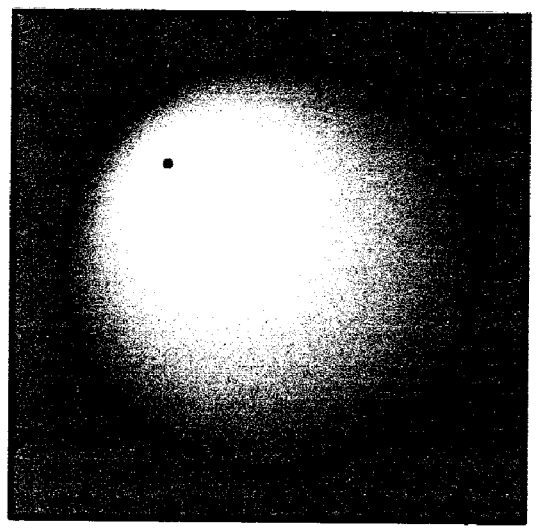
FIG. 16 is a representation of rendered graphics resulting from data in a radial gradient brush object, in accordance with an aspect of the present invention.

The RadialGradient is similar in programming model to the linear gradient. However, whereas the linear gradient has a start and end point to define the gradient vector, the radial gradient has a circle along with a focal point to define the gradient behavior. The circle defines the end point of the gradient—in other words, a gradient stop at 1.0 defines the color at the circle's circumference. The focal point defines center of the gradient. A gradient stop at 0.0 defines the color at the focal point. FIG. 16 represents a RadialGradient that (in grayscale) goes from white to grey. The outside circle represents the gradient circle while the solid dot denotes the focal point. This gradient has SpreadMethod set to Pad.

```
public sealed class System.Windows.Media.RadialGradient :
        GradientBrush
{
    public RadialGradient( );   // initialize to transparent
    // Sets up a gradient with two colors.
    // This implies RelativeToBoundingBox for the
```

```
Gradient Units
    // property along with a center at (0.5,0.5)
    // a radius of 0.5 and a focal point at (0.5,0.5)
    public RadialGradient (Color color1, Color color2);
    public new RadialGradient Copy( );   // hides
Changeable.Copy( )
    // Default is 0.5,0.5
    [Animation("CenterAnimations")]
    public Point Center { get; set; }
    public PointAnimationCollection CenterAnimations { get;
set; }
    // Default is 0.5
    [Animation("RadiusXAnimations")]
    public double RadiusX { get; set; }
    public DoubleAnimationCollection RadiusXAnimations { get;
set; }
    // Default is 0.5
    [Animation("RadiusYAnimations")]
    public double RadiusY { get; set; }
    public DoubleAnimationCollection RadiusYAnimations { get;
set; }
    // Default is 0.5,0.5
    [Animation("FocusAnimations")]
    public Point Focus { get; set; }
    public PointAnimationCollection FocusAnimations { get;
set; }
}
```

The markup for RadialGradient allows specification of a RadialGradient with two color stops, at offsets 0 and 1 respectively. The default MappingMode is used, which is RelativeToBoundingBox, as are the default radii, 0.5:

```
radial-gradient-brush:
    "RadialGradient" comma-wsp color comma-wsp color
```

The TileBrush is an abstract base class which contains logic to describe a tile and a means by which that tile should fill an area. Subclasses of TileBrush contain content, and logically define a way to fill an infinite plane.

The Stretch enum is used to describe how a ViewBox (source coordinate space) is mapped to a ViewPort (destination coordinate space). This is used in TileBrush:

```
public enum System.Windows.Stretch
{
    // Preserve original size
    None,
    // Aspect ratio is not preserved, ViewBox fills ViewPort
    Fill,
    // Aspect ratio is preserved, VewBox is uniformly scaled
as large as
    // possible such that both width and height fit within
ViewPort
    Uniform,
    // Aspect ratio is preserved, VewBox is uniformly scaled
as small as
    // possible such that the entire ViewPort is filled by
the ViewBox
    UniformToFill
}
```

Figure 18:
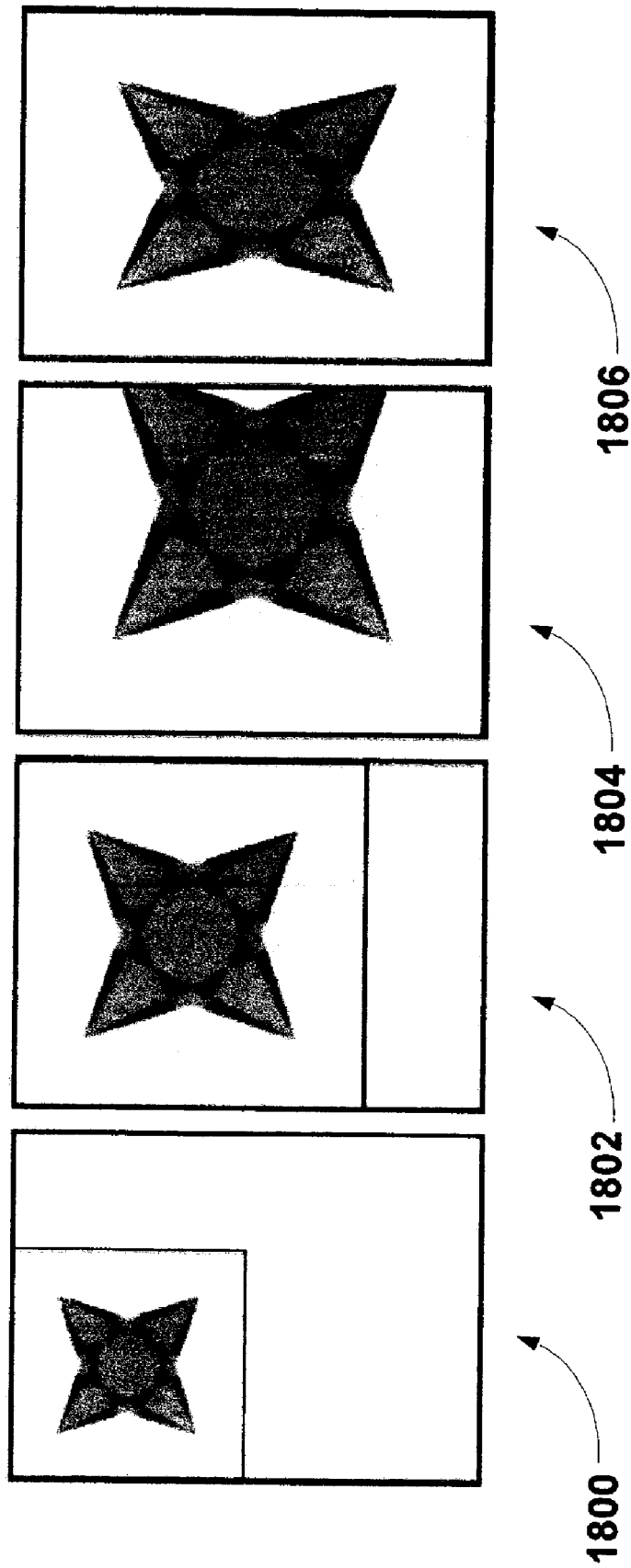
FIG. 18 is a representation of rendered graphics resulting from having various stretch values, in accordance with an aspect of the present invention.

FIG. 18 provides stretch examples. In these examples, the contents are top/left aligned.

The TileMode enum is used to describe if and how a space is filled by Tiles. A TileBrush defines where the base Tile is (specified by the ViewPort). The rest of the space is filled based on the TileMode value.

```
public enum System.Windows.Media.TileMode
{
    // Do not tile - only the base tile is drawn, the remaining
area is
    // left as transparent
    None,
    // The basic tile mode - the base tile is drawn and the
remaining area
    // is filled by repeating the base tile such that the right
edge of one
    // tile butts the left edge of the next, and similarly for
bottom and top
    Tile,
    // The same as tile, but alternate columns of tiles are
flipped
    // horizontally. The base tile is drawn untransformed.
    FlipX,
    // The same as tile, but alternate rows of tiles are
flipped vertically
    // The base tile is drawn untransformed.
    FlipY,
    // The combination of FlipX and FlipY. The base tile is
drawn
    // untransformed
    FlipXY
}
```

Figure 19:
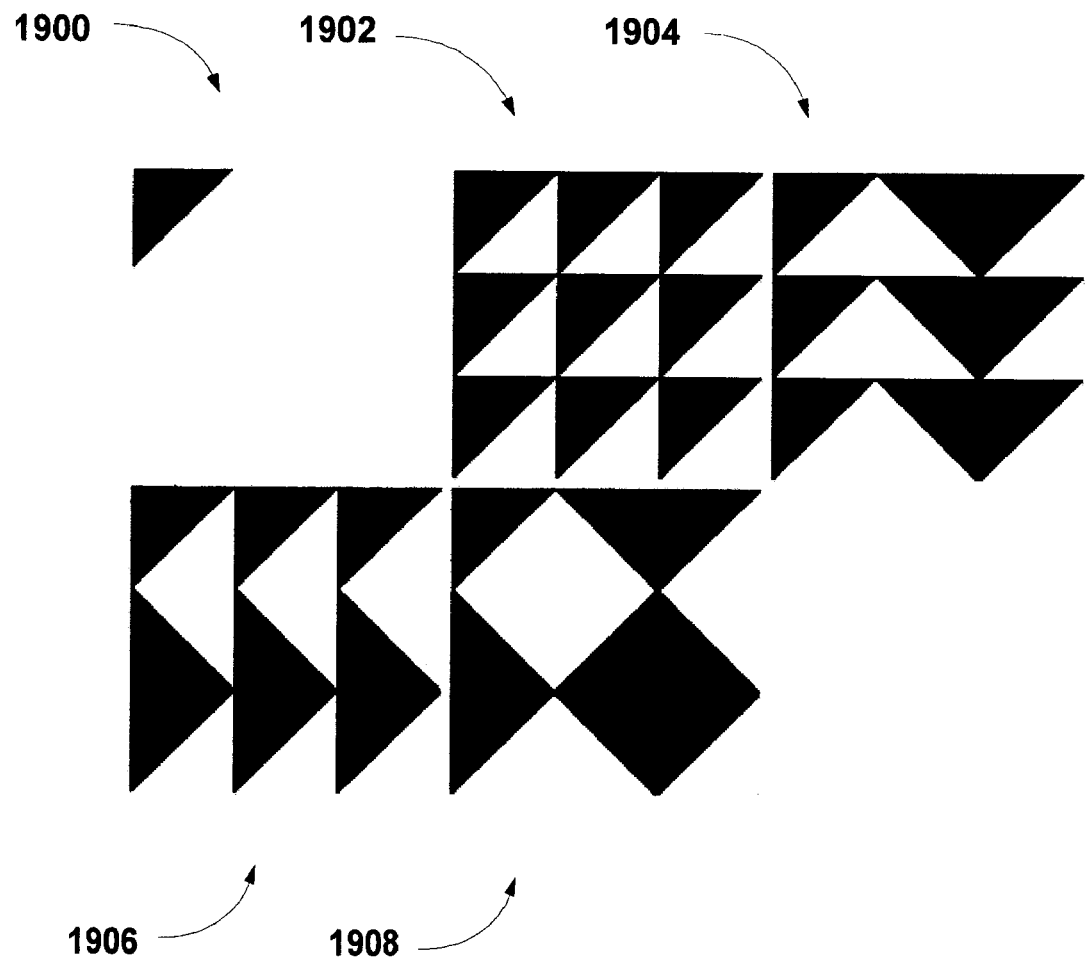
FIG. 19 is a representation of rendered graphics resulting from having various tile values, in accordance with an aspect of the present invention.

FIG. 19 provides TileMode examples. The top left-most tile in each example is the base tile. These examples represent None, Tile, FlipX, FlipY and FlipXY.

The VerticalAlignment enum is used to describe how content is positioned within a container vertically:

```
public enum System.Windows.VerticalAlignment
{
    // Align contents towards the top of a space
    Top,
    // Center contents vertically
    Center,
    // Align contents towards the bottom of a space
    Bottom,
}
```

The HorizontalAlignment enum is used to describe how content is positioned within a container horizontally.

```
public enum System.Windows.HorizontalAlignment
{
    // Align contents towards the left of a space
    Left,
    // Center contents horizontally
    Center,
    // Align contents towards the right of a space
    Right,
}
```

The TileBrush properties select a rectangular portion of the infinite plane to be a tile (the ViewBox) and describe a destination rectangle (ViewPort) which will be the base Tile in the area being filled. The remaining destination area will be filled based on the TileMode property, which controls if and how the original tile is replicated to fill the remaining space:

```
public abstract class System.Windows.Media.TileBrush : Brush
{
    public new TileBrush Copy( );   // hides Brush.Copy( )
    // Default is RelativeToBoundingBox
    public BrushMappingMode ViewPortUnits { get; set; }
    // Default is RelativeToBoundingBox
    public BrushMappingMode ContentUnits { get; set; }
```

-continued

```
        // Default is Rect.Empty
        [Animation("ViewBoxAnimations")]
        public Rect ViewBox { get; set; }
        public RectAnimationCollection ViewBoxAnimations { get;
set; }
        // Default is Fill
        public Stretch Stretch { get; set; }
        // Default is None
        public TileMode TileMode { get; set; }
        // Default is Center
        public HorizontalAlignment HorizontalAlignment { get; set;
}
        // Default is Center
        public VerticalAlignment VerticalAlignment { get; set; }
        // Default is 0,0,1,1
        [Animation("ViewPortAnimations")]
        public Rect ViewPort { get; set; }
        public RectAnimationCollection ViewPortAnimations { get;
set; }
    }
```

A TileBrush's contents have no intrinsic bounds, and effectively describe an infinite plane. These contents exist in their own coordinate space, and the space which is being filled by the TileBrush is the local coordinate space at the time of application. The content space is mapped into the local space based on the ViewBox, ViewPort, Alignments and Stretch properties. The ViewBox is specified in content space, and this rectangle is mapped into the ViewPort rectangle.

The ViewPort defines the location where the contents will eventually be drawn, creating the base tile for this Brush. If the value of ViewPortUnits is Absolute, the value of ViewPort is considered to be in local space at the time of application. If, instead, the value of ViewPortUnits is RelativeToBoundingBox, then the value of ViewPort is considered to be in the coordinate space where 0,0 is the top/left corner of the bounding box of the object being painted and 1,1 is the bottom/right corner of the same box. For example, consider a RectangleGeometry being filled which is drawn from 100,100 to 200, 200. Then, if the ViewPortUnits is Absolute, a ViewPort of (100,100,100,100) would describe the entire content area. If the ViewPortUnits is RelativeToBoundingBox, a ViewPort of (0,0,1,1) would describe the entire content area. If the ViewPort's Size is empty and the Stretch is not None, this Brush renders nothing.

The ViewBox is specified in content space. This rectangle is transformed to fit within the ViewPort as determined by the Alignment properties and the Stretch property. If the Stretch is None, then no scaling is applied to the contents. If the Stretch is Fill, then the ViewBox is scaled independently in both X and Y to be the same size as the ViewPort. If the Stretch is Uniform or UniformToFill, the logic is similar but the X and Y dimensions are scaled uniformly, preserving the aspect ratio of the contents. If the Stretch is Uniform, the ViewBox is scaled to have the more constrained dimension equal to the ViewPort's size. If the Stretch is UniformToFill, the ViewBox is scaled to have the less constrained dimension equal to the ViewPort's size. Another way to think of this is that both Uniform and UniformToFill preserve aspect ratio, but Uniform ensures that the entire ViewBox is within the ViewPort (potentially leaving portions of the ViewPort uncovered by the ViewBox), and UniformToFill ensures that the entire ViewPort is filled by the ViewBox (potentially causing portions of the ViewBox to be outside the ViewPort). If the ViewBox's area is empty, then no Stretch will apply. Alignment will still occur, and it will position the "point" ViewBox.

Once the ViewPort is determined (based on ViewPortUnits) and the ViewBox's destination size is determined (based on Stretch), the ViewBox needs to be positioned within the ViewPort. If the ViewBox is the same size as the ViewPort (if Stretch is Fill, or if it just happens to occur with one of the other three Stretch values), then the ViewBox is positioned at the Origin so as to be identical to the ViewPort. If not, then HorizontalAlignment and VerticalAlignment are considered. Based on these properties, the ViewBox is aligned in both X and Y dimensions. If the HorizontalAlignment is Left, then the left edge of the ViewBox will be positioned at the Left edge of the ViewPort. If it is Center, then the center of the ViewBox will be positioned at the center of the ViewPort, and if Right, then the right edges will meet. The process is repeated for the Y dimension.

If the ViewBox is Empty it is considered unset. If it is unset, then ContentUnits are considered. If the ContentUnits are Absolute, no scaling or offset occurs, and the contents are drawn into the ViewPort with no transform. If the ContentUnits are RelativeToBoundingBox, then the content origin is aligned with the ViewPort Origin, and the contents are scaled by the object's bounding box's width and height.

When filling a space with a TileBrush, the contents are mapped into the ViewPort as above, and clipped to the ViewPort. This forms the base tile for the fill, and the remainder of the space is filled based on the Brush's TileMode. If set, the Brush's transform is applied, which occurs after the other mapping, scaling, offsetting, and so forth.

A VisualBrush is a TileBrush whose contents are specified by a Visual. This Brush can be used to create complex patterns, or it can be used to draw additional copies of the contents of other parts of the scene.

```
    public sealed class System.Windows.Media.VisualBrush :
TileBrush
    {
        public VisualBrush( );    // initializes to transparent
        public VisualBrush(Visual v);
        public new VisualBrush Copy( );    // hides TileBrush.Copy( )
        // Visual - Default is null (transparent Brush)
        public Visual Visual { get; set; }
    }
```

ImageBrush is a TileBrush having contents specified by an ImageData. This Brush can be used to fill a space with an Image.

```
    public sealed class System.Windows.Media.ImageBrush :
TileBrush
    {
        public ImageBrush( );    // Initializes to transparent
contents
        // Sets the image, sets ViewBox to (0,0,Width,Height)
        // and Stretch to Fill
        public ImageBrush(ImageData image);
        public new ImageBrush Copy( );    // hides TileBrush.Copy( )
        // Default is null
        public ImageData ImageData { get; set; }
        // Default is true
        // If this is true, the ViewBox property will be
overridden
        // and effectively set to the native size of the Image
        public bool SizeViewBoxToContent { get; set; }
    }
```

VideoBrush is a TileBrush having contents specified by a VideoData. This Brush can be used to fill a space with a Video.

```
public sealed class System.Windows.Media.VideoBrush :
TileBrush
{
    public VideoBrush( );   // Initializes to transparent
contents
    // Sets the image, sets ViewBox to (0,0,Width,Height) and
the
    // Stretch to Fill
    public VideoBrush(VideoData video);
    public new VideoBrush Copy( );   // hides TileBrush.Copy( )
    // Default is null
    public VideoData VideoData { get; set; }
    // Default is true
    // If this is true, the ViewBox property will be
overridden
    // and effectively set to the native size of the Video
    public bool SizeViewBoxToContent { get; set; }
}
```

NineGridBrush is a Brush which always fills the object bounding box with its content image, and the image stretch isn't accomplished purely via a visual scale. The Image source is divided into nine rectangles by four borders (hence the name NineGrid). The contents of the image in each of those nine regions are scaled in 0, 1 or 2 dimensions until they fill the object bounding box. The dimensions in which each section is scaled can be seen in this diagram: FIG. 17 represents the concept of a NineGrid, being enlarged from a first instance 1702 to a second instance 1704, with four types of showing the nine grids which are defined by the Top, Left, Bottom and Right borders. The arrows in each grid square show the dimension(s) in which those contents will be stretched to meet the ViewPort size.

In addition to the nine grid regions pictured above, there is an optional "tenth" grid. This takes the form of an additional image which is centered in the ViewPort and which is not scaled. This can be used to place a shape in the center of a button, etc. This "tenth grid" is called a glyph, and is exposed by the GlyphImageData property:

```
public sealed class System.Windows.Media.NineGridBrush : Brush
{
    public NineGridBrush(ImageData imageData,
                        int LeftBorder,
                        int RightBorder,
                        int TopBorder,
                        int BottomBorder);
    public NineGridBrush(ImageData imageData,
                        int LeftBorder,
                        int RightBorder,
                        int TopBorder,
                        int BottomBorder,
                        ImageData glyphImage);
    public new NineGridBrush Copy( );   // hides Brush.Copy( )
    // Default is null
    public ImageData ImageData { get; set; }
    // Default is 0
    public int LeftBorder { get; set; }
    // Default is 0
    public int RightBorder { get; set; }
    // Default is 0
    public int TopBorder { get; set; }
    // Default is 0
    public int BottomBorder { get; set; }
    // Default is null
    public ImageData GlyphImageData { get; set; }
}
```

Note that the border members count in from the edge of the image in image pixels The Pen is an object that takes a Brush and other parameters that describe how to stroke a space/Geometry. Conceptually, a Pen describes how to create a stroke area from a Geometry. A new region is created which is based on the edges of the Geometry, the Pen's Thickness, the PenLineJoin, PenLineCap, and so forth. Once this region is created, it is filled with the Brush.

```
public sealed class System.Windows.Media.Pen : Changeable
{
    // Constructors
    Public Pen( );
    public Pen(Brush brush, double thickness);
    public new Pen Copy( );   // hides Changeable.Copy( )
    // Properties
    // Default is DashArrays.Solid (no dashes)
    public DoubleCollection DashArray { get; set;}
    // Default is 0
    [Animations(DashOffsetAnimations)]
    public double DashOffset { get; set;}
    public DoubleAnimationCollection DashOffsetAnimations {
get; set; }
    // Default is Flat
    public PenLineCap StartLineCap { get; set;}
    // Default is Flat
    public PenLineCap EndLineCap { get; set;}
    // Default is Flat
    public PenDashCap DashCap { get; set;}
    // Default is Miter
    public PenLineJoin LineJoin { get; set;}
    // Default is 10
    public double MiterLimit { get; set;}
    // Default is null
    public Brush Brush { get; set;}
    // Default is 1.0
    [Animations(ThicknessAnimations)]
    public double Thickness { get; set;}
    public DoubleAnimationCollection ThicknessAnimations {
get; set;}
}
```

The PenLineCap determines how the ends of a stroked line are drawn:

```
public enum System.Windows.Media.PenLineCap
{
    // This is effectively no line cap - the line is squared
off
    // at the last point in the line
    Flat,
    // The line is capped by a hemi-circle of diameter equal
to
    // the line width
    Round,
    // The dash is capped by a triangle
    Triangle,
    // The line is capped with a square of side with equal to
the
    // line width, centered on the end point
    Square
}
```

The PenDashCap determines how the ends of each dash in a dashed, stroked line are drawn:

```
public enum System.Windows.Media.PenDashCap
{
    // This is effectively no dash cap - the line is squared
```

```
        off
            // at the last point in the line
            Flat,
            // The dash is capped by a hemi-circle of diameter equal
    to
            // the line width
            Round,
            // The dash is capped by a triangle
            Triangle
    }
```

The PenLineJoin determines how joints are draw when stroking a line:

```
    public enum System.Windows.Media.PenLineJoin
    {
            // A sharp corner is created at the intersection of the
    outer
            // edges of the intersecting line segments
            Miter,
            // Similar to Miter, but the corner is rounded
            Round,
            // A beveled join, this produces a diagonal corner
            Bevel
    }
```

The DashArrays class comprises static properties which provide access to common, well-known dash styles:

```
    public sealed System.Windows.Media.DashArrays
    {
            // A solid Dash array (no dashes)
            public static DoubleCollection Solid { get; }
            // Dash - 3 on, 1 off
            public static DoubleCollection Dash { get; }
            // Dot - 1 on, 1 off
            public static DoubleCollection Dot { get; }
            // DashDot - 3 on, 1 off, 1 on, 1 off
            public static DoubleCollection DashDot { get; }
            // DashDotDot - 3 on, 1 off, 1 on, 1 off, 1 on, 1 off
            public static DoubleCollection DashDotDot { get; }
    }
```

Another brush object represented in FIG. 13 is a VisualBrush object. A VisualBrush is a TileBrush whose contents are specified by a Visual. This Brush can be used to create complex patterns, or it can be used to draw additional copies of the contents of other parts of the scene.

```
    public sealed class System.Windows.Media.VisualBrush :
    TileBrush
    {
            public VisualBrush( );   // initializes to transparent
            public VisualBrush(Visual v);
            public new VisualBrush Copy( );   // hides TileBrush.Copy( )
            // Visual - Default is null (transparent Brush)
            public Visual Visual { get; set; }
    }
```

Conceptually, the VisualBrush provides a way to have a visual drawn in a repeated, tiled fashion as a fill. This is represented in FIG. 12 by the visual brush referencing a visual (and any child visuals) that specifies a single circular shape 1220, with that circular shape filling a rectangle 1222. Thus, the VisualBrush object may reference a visual to define how that brush is to be drawn, which introduces a type of multiple use for visuals. In this manner, a program may use an arbitrary graphics "metafile" to fill an area via a brush or pen. Since this is a compressed form for storing and using arbitrary graphics, it serves a graphics resource.

In one implementation, a VisualBrush's contents have no intrinsic bounds, and effectively describe an infinite plane. These contents exist in their own coordinate space, and the space which is being filled by the VisualBrush is the local coordinate space at the time of application. The content space is mapped into the local space based on the ViewBox, ViewPort, Alignments and Stretch properties. The ViewBox is specified in content space, and this rectangle is mapped into the ViewPort (as specified via the Origin and Size properties) rectangle.

The ViewPort defines the location where the contents will eventually be drawn, creating the base tile for this Brush. If the value of DestinationUnits is UserSpaceOnUse, the Origin and Size properties are considered to be in local space at the time of application. If instead the value of DestinationUnits is ObjectBoundingBox, then an Origin and Size are considered to be in the coordinate space, where 0,0 is the top/left corner of the bounding box of the object being brushed, and 1,1 is the bottom/right corner of the same box. For example, consider a RectangleGeometry being filled which is drawn from 100, 100 to 200,200. In such an example, if the DestinationUnits is UserSpaceOnUse, an Origin of 100,100 and a Size of 100,100 would describe the entire content area. If the DestinationUnits is ObjectBoundingBox, an Origin of 0,0 and a Size of 1,1 would describe the entire content area. If the Size is empty, this Brush renders nothing.

The ViewBox is specified in content space. This rectangle is transformed to fit within the ViewPort as determined by the Alignment properties and the Stretch property. If the Stretch is none, then no scaling is applied to the contents. If the Stretch is Fill, then the ViewBox is scaled independently in both X and Y to be the same size as the ViewPort. If the Stretch is Uniform or UniformToFill, the logic is similar but the X and Y dimensions are scaled uniformly, preserving the aspect ratio of the contents. If the Stretch is Uniform, the ViewBox is scaled to have the more constrained dimension equal to the ViewPort's size. If the Stretch is UniformToFill, the ViewBox is scaled to have the less constrained dimension equal to the ViewPort's size. In other words, both Uniform and UniformToFill preserve aspect ratio, but Uniform ensures that the entire ViewBox is within the ViewPort (potentially leaving portions of the ViewPort uncovered by the ViewBox), and UniformToFill ensures that the entire ViewPort is filled by the ViewBox (potentially causing portions of the ViewBox to be outside the ViewPort). If the ViewBox is empty, then no Stretch will apply. Note that alignment will still occur, and it will position the "point" ViewBox.

FIG. 18 provides representations of a single tile 1800 of graphics rendered with various stretch settings, including a tile 1800 when stretch is set to "none." The tile 1802 is a representation of when the stretch is set to "Uniform," the tile 1804 when stretch is set to "UniformToFill," and the tile 1806 when stretch is set to "Fill."

Once the ViewPort is determined (based on DestinationUnits) and the ViewBox's size is determined (based on Stretch), the ViewBox needs to be positioned within the ViewPort. If the ViewBox is the same size as the ViewPort (if Stretch is Fill, or if it just happens to occur with one of the other three Stretch values), then the ViewBox is positioned at the Origin so as to be identical to the ViewPort. Otherwise, HorizontalAlignment and VerticalAlignment are considered. Based on these properties, the ViewBox is aligned in both X and Y dimensions. If the HorizontalAlignment is Left, then the left edge of the ViewBox will be positioned at the Left edge of the ViewPort. If it is Center, then the center of the ViewBox will be positioned at the center of the ViewPort, and if Right, then the right edges will meet. The process is repeated for the Y dimension.

If the ViewBox is (0,0,0,0), it is considered unset, whereby ContentUnits are considered. If the ContentUnits are User-SpaceOnUse, no scaling or offset occurs, and the contents are drawn into the ViewPort with no transform. If the ContentUnits are ObjectBoundingBox, then the content origin is aligned with the ViewPort Origin, and the contents are scale by the object's bounding box's width and height.

When filling a space with a VisualBrush, the contents are mapped into the ViewPort as above, and clipped to the ViewPort. This forms the base tile for the fill, and the remainder of the space is filled based on the Brush's TileMode. Finally, if set, the Brush's transform is applied—it occurs after all the other mapping, scaling, offsetting, etc.

The TileMode enumeration is used to describe if and how a space is filled by its Brush. A Brush which can be tiled has a tile rectangle defined, and this tile has a base location within the space being filled. The rest of the space is filled based on the TileMode value. FIG. 19 provides a representation of example graphics with various TileMode settings, including "None" 1900, "Tile" 1092, "FlipX" 1904, "FlipY" 1906 and "FlipXY" 1908. The top left-most tile in the various example graphics comprises the base tile.

Figure 20:
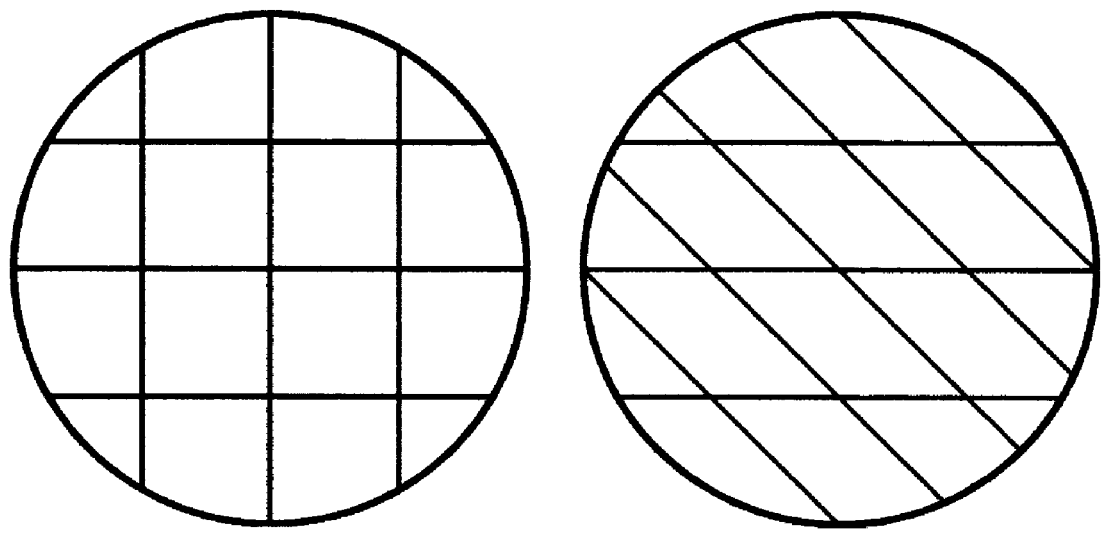
FIG. 20 is a representation of a grid and transformed grid, resulting from data in a visual brush object, in accordance with an aspect of the present invention.
Figure 21:
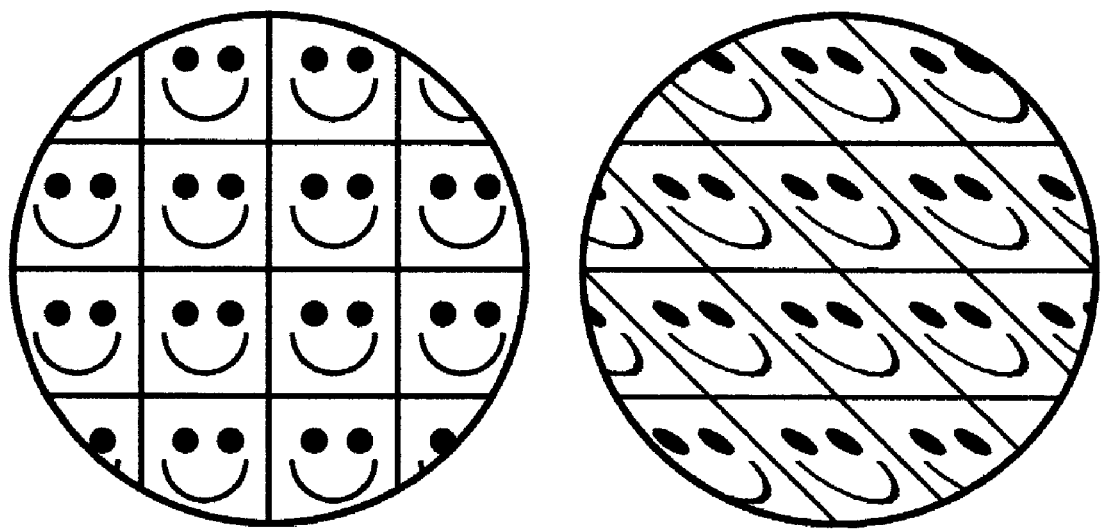
FIG. 21 is a representation of the grid and transformed grid, with rendered graphics therein drawn from a visual, in accordance with an aspect of the present invention.

FIG. 20 represents a VisualBrush Grid that is defined for the tiles in a VisualBrush. The first circle is a simple grid, and the second has a Transform with a Skew in the x direction of 47. FIG. 21 shows this being filled with an image.

Returning to FIG. 13, image brush derives from tile brush and thus can be tiled. NineGridBrush is very similar to ImageBrush except the image is warped based on the size. In essence, NineGridBrush may be thought of a custom type of Stretch, in which certain parts of the image stretch, while others (e.g., borders) do not. Thus, while the Size of the image in the ImageBrush will cause a simple scale, the NineGridBrush will produce a non-uniform scale up to the desired size. The units for the non-scaled areas are the user units when the brush is applied, which means that ContentUnits (if it existed for NineGridBrush) would be set to UserUnitsOnUse. The Transform property of the Brush can be used effectively. Note that the border members count in from the edge of the image.

Figure 7:
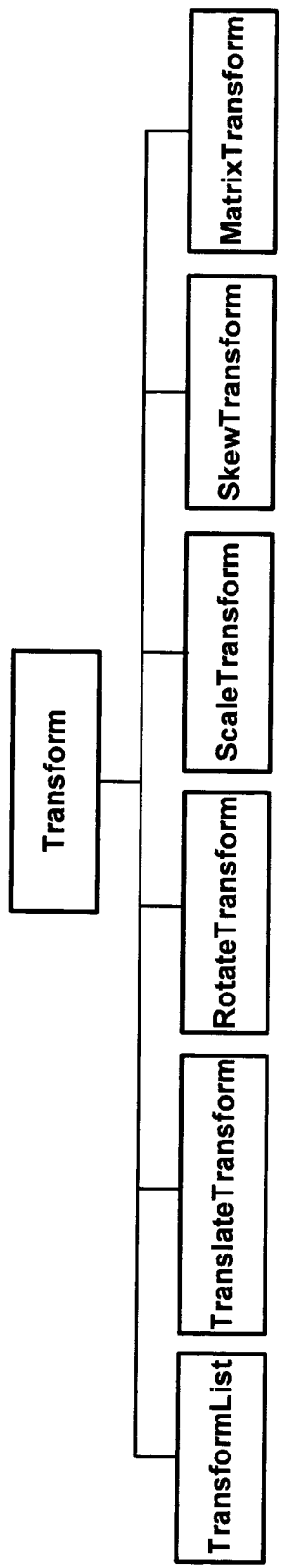
FIG. 7 is a representation of a transform class hierarchy, in accordance with an aspect of the present invention.

As generally described above, the graphics object model of the present invention includes a Transform object model, which includes the types of transforms represented in the hierarchy of FIG. 7, under a Transform base class. These different types of components that make up a transform may include TransformList, TranslateTransform, RotateTransform, ScaleTransform, SkewTransform, and MatrixTransform. Individual properties can be animated, e.g., a program developer can animate the Angle property of a RotateTransform.

Matrices for 2D computations are represented as a 3×3 matrix. For the needed transforms, only six values are needed instead of a full 3×3 matrix. These are named and defined as follows.

$$\begin{bmatrix} m00 & m01 & 0 \\ m10 & m11 & 0 \\ m20 & m21 & 1 \end{bmatrix}$$

When a matrix is multiplied with a point, it transforms that point from the new coordinate system to the previous coordinate system:

$$[X_{newCoordSys}\ y_{newCoordSys}\ 1] \cdot \begin{bmatrix} m00 & m01 & 0 \\ m10 & m11 & 0 \\ m20 & m21 & 1 \end{bmatrix} = [X_{oldCoordSys}\ y_{oldCoordSys}\ 1]$$

Transforms can be nested to any level. Whenever a new transform is applied it is the same as post-multiplying it onto the current transform matrix:

$$[X_{newCoordSys}\ y_{newCoordSys}\ 1] \cdot$$

$$\begin{bmatrix} m00_2 & m01_2 & 0 \\ m10_2 & m11_2 & 0 \\ m20_2 & m21_2 & 1 \end{bmatrix} \cdot \begin{bmatrix} m00_1 & m01_1 & 0 \\ m10_1 & m11_1 & 0 \\ m20_1 & m21_1 & 1 \end{bmatrix} = [X_{oldCoordSys}\ y_{oldCoordSys}\ 1]$$

Most places in the API do not take a Matrix directly, but instead use the Transform class, which supports animation.

```
public struct System.Windows.Media.Matrix
{
    // Construction and setting
    public Matrix( ); // defaults to identity
    public Matrix(
        double m00, double m01,
        double m10, double m11,
        double m20, double m21);
    // Identity
    public static readonly Matrix Identity;
    public void SetIdentity( );
    public bool IsIdentity { get; }
    public static Matrix operator *(Matrix matrix1, Matrix matrix2);
    public static Point operator *(Matrix matrix, Point point);
    // These function reinitialize the current matrix with
    // the specified transform matrix.
    public void SetTranslation(double dx, double dy);
    public void SetTranslation(Size offset);
    public void SetRotation(double angle); // degrees
    public void SetRotation(double angle, Point center); // degrees
    public void SetRotationRadians(double angle);
    public void SetRotationRadians(double angle, Point center);
    public void SetScaling(double sx, double sy);
    public void SetScaling(double sx, double sy, Point center);
    public void SetSkewX(double angle); // degrees
    public void SetSkewY(double angle); // degrees
    public void SetSkewXRadians(double angle);
    public void SetSkewYRadians(double angle);
    // These function post-multiply the current matrix
    // with the specified transform
    public void ApplyTranslation(double dx, double dy);
    public void ApplyTranslation(Size offApply);
    public void ApplyRotation(double angle); // degrees
    public void ApplyRotation(double angle, Point center); //
        degrees
    public void ApplyRotationRadian(double angle);
    public void ApplyRotationRadian(double angle, Point center);
    public void ApplyScaling(double sx, double sy);
    public void ApplyScaling(double sx, double sy, Point center);
    public void ApplySkewX(double angle); // degrees
    public void ApplySkewY(double angle); // degrees
    public void ApplySkewXRadians(double angle);
    public void ApplySkewYRadians(double angle);
    public void ApplyMatrix(Matrix matrix);
    // Inversion stuff
    public double Determinant { get; }
    public bool IsInvertible { get; }
    public void Invert( );   // Throws ArgumentException if
        !IsInvertable
```

-continued

```
        public static Matrix Invert(Matrix matrix);
        // Individual members
        public double M00 { get; set; }
        public double M01 { get; set; }
        public double M10 { get; set; }
        public double M11 { get; set; }
        public double M20 { get; set; }
        public double M21 { get; set; }
};
```

Markup Language and Object Model for Vector Graphics

In accordance with an aspect of the present invention, a markup language and element object model are provided to enable user programs and tools to interact with the scene graph data structure 216 without requiring a specific knowledge of the details of the API layer 212 (FIG. 2). In general, a vector graphics markup language is provided, which comprises an interchange format, along with a simple markup based authoring format for expressing vector graphics via the element object model. Via this language, markup (e.g., HTML or XML-type content) may be programmed. Then, to build the scene graph, the markup is parsed and translated into the appropriate visual API layer objects that were as described above. At this higher operating level, an element tree, the property system and the layout system are provided to handle much of the complexity, making it straightforward for scene designers to design possibly complex scenes.

In general, the vector graphics system generally provides a set of shape and other elements, integration with a general property system, a grouping and compositing system, and a two-tiered (element level and resource level) approach so that the user can program in a way that matches flexibility and performance needs. In keeping with one aspect of the present invention, the element object model for dealing with vector graphics correlates with the scene graph object model. In other words, the vector graphics system and the Visual API layer share a set of resources at the element object model level, e.g., the Brush object is used when drawing at the Visual API and it is also the type of the fill property on Shape. Thus, in addition to having elements that correlate with the scene graph objects, the markup language shares a number of primitive resources (e.g., brushes, transforms, and so forth) with the Visual API layer. The vector graphics system also exposes and extends the animation capabilities of the Visual API layer, which is largely shared between the levels.

Further, as described below, the vector graphics system can program to different profiles, or levels, including an element level and a resource level. In the element level, each of the drawing shapes is represented as an element at the same level as the rest of the programmable elements in a page/screen. This means that the shapes interact in a full way with the layout system, events and properties. In the resource level, the vector graphics systems operates in a pure resource format, similar to a traditional graphics metafile. The resource level is efficient, but has somewhat limited support for cascaded properties, eventing and fine-grained programmability. The scene designer thus has the ability to balance efficiency with programmability as needed.

In keeping with one aspect of the present invention, the vector graphics system at the resource level also correlates to the visual API layer, in that the resource level markup, in one implementation, is expressed as a VisualBrush. When the resource markup is parsed, a visual object is created. The visual object is set into a VisualBrush which may be used by shapes, controls and other elements at the element level.

Figure 22:
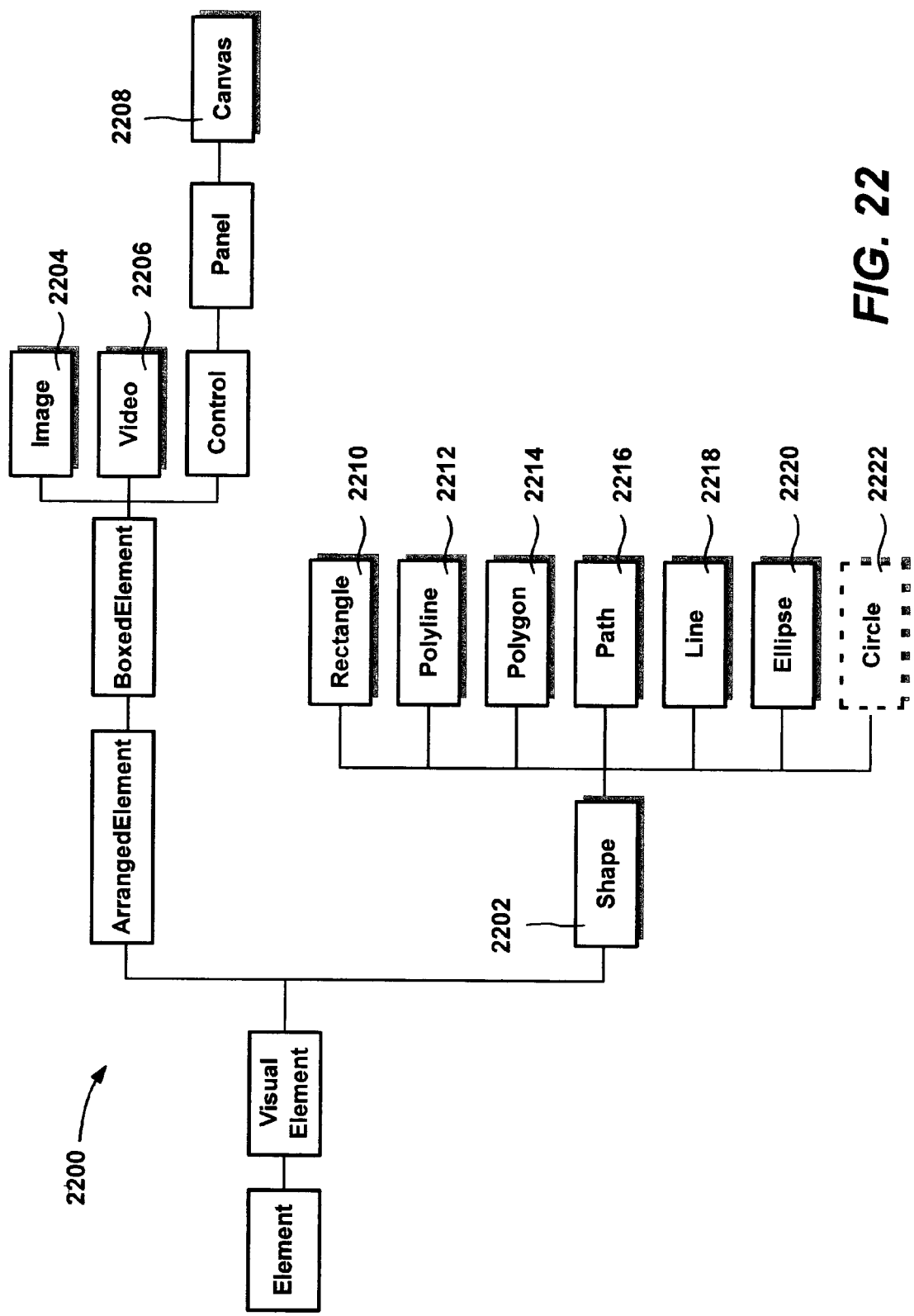
FIG. 22 is a representation of element classes of the element object model, in accordance with an aspect of the present invention.

FIG. 22 is a representation of the element class hierarchy 2200. The classes of the markup language object model of the present invention are represented via shadowed boxes, and include a shape class 2502, an image class 2504, a video class 2206 and a canvas class 2208. Elements of the shape class include rectangle 2210, polyline 2212, polygon 2214, path 2216, line 2218 and ellipse 2220. Note that in some implementations, a circle element may not be present as indicated by the dashed box 2222 in FIG. 22, however for purposes of the various examples herein, the circle element 2222 will be described. Each element may include or be associated with fill (property) data, stroke data, clipping data, transform data, filter effect data and mask data.

As described below, shapes correspond to geometry that is drawn with inherited and cascaded presentation properties. The presentation properties are used to construct the pen and the brush needed to draw the shapes. In one implementation, shapes are full presenters, like other control elements. However, in other implementations, a canvas class 2508 may be provided as a container for shapes, and shapes can only be drawn when in a canvas element. For example, to keep shapes lightweight, shapes may not be allowed to have attached presenters. Instead, the canvas has an attached presenter and draws the shapes. Canvas elements are described in more detail below.

As also described below, the image class is more specific than a shape, and for example can include border data, which may be complex. For example, a border can be specified as one color on the top, a different color on the sides, with possibly various thicknesses specified and other properties set. Position, size rotation and scale may be set for an image or similar boxed element, such as text or video. Note that the image and video elements can exist and be shown outside of a canvas element, and also inherit from BoxedElement, e.g., to get the background, borders and padding support from that element.

The video element allows video (or similar multimedia) to be played within a displayed element. In this manner, the vector graphics system provides a markup interface to the API layer that is seamlessly consistent across multimedia, including text, 2D graphics, 3D graphics, animation, video, still images and audio. This allows designers to that learn to work with one media to easily integrate other media into applications and documents. The vector graphics system also enables multimedia to be animated in the same way as other elements, again allows designers the ability to use multimedia like other elements, yet without sacrificing the core intrinsic uniqueness of each individual media type. For example, a designer can use the same naming scheme for rotating, scaling, animating, drawing, compositing and other effects across different media types, whereby designers may easily create very rich applications, as well as allowing for a very efficient rendering and compositing implementation to be built underneath.

Figure 23:
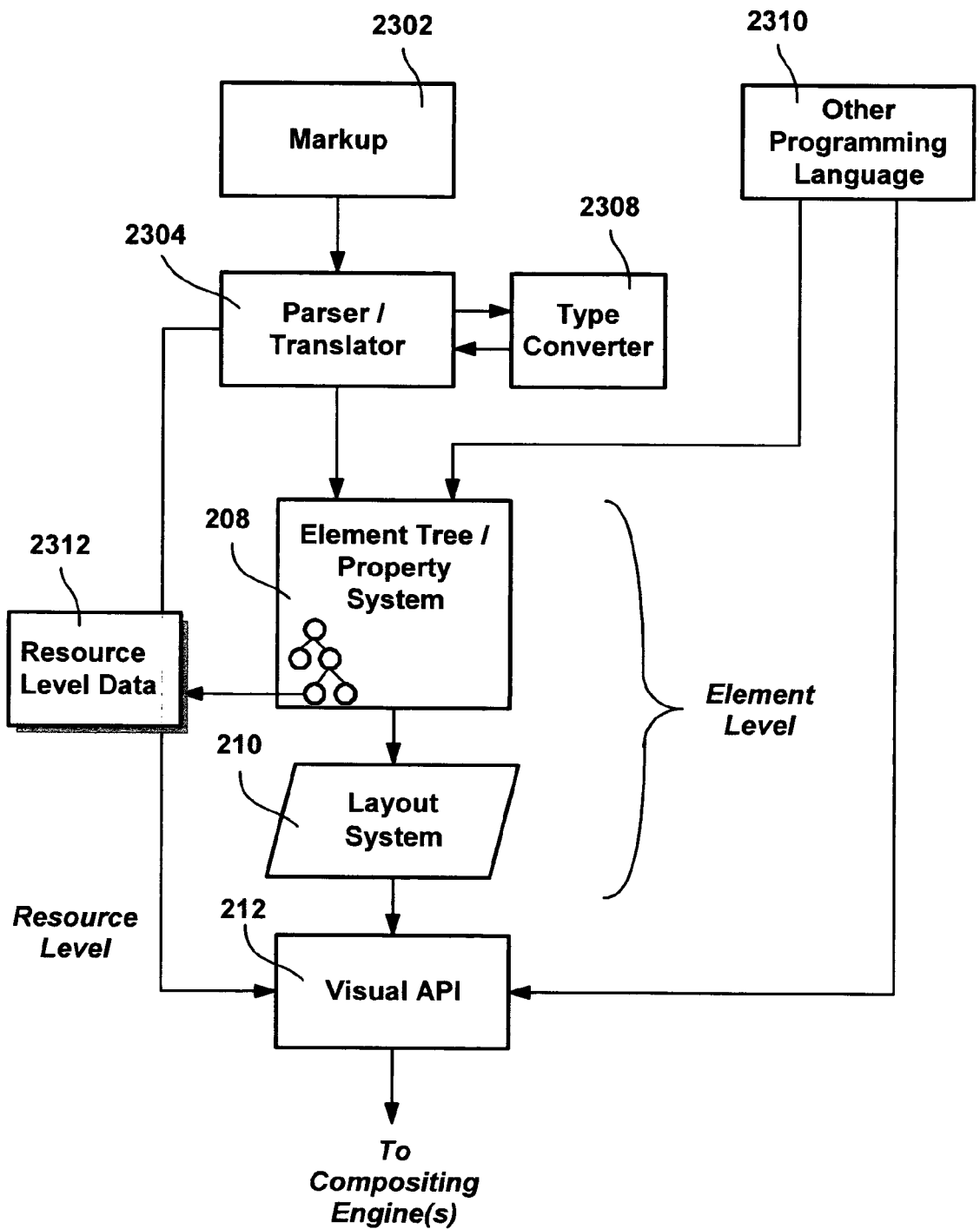
FIG. 23 is a representation of components for interpreting markup language code to interface with the visual API layer, in accordance with an aspect of the present invention.

FIG. 23 represents one implementation in which the markup code 2302 is interpreted by a parser/translator 2304. In general, the parser/translator 2304 adds elements to an element tree/property system 208 (also represented in FIG. 2) and attaches presenters to those elements. The layout system 210 then takes the element tree 210 with the attached presenters and translates the data to objects and calls to the visual API layer 212. Note that not all elements need to be translated, only those with attached presenters.

In general, the markup is resolved to objects, in which an XML scheme for the XAML markup is usually declared at top of a markup file as follows:

```
<Canvas
    xmlns="http://schemas.microsoft.com/2003/xaml"
        xmlns:def="Definition"
        def:Class="Surfin.ChannelBrowser"
        def:CodeBehind="ChannelBrowser.xaml.cs"
        ID="mainCanvas" Background="Black"
    Width="100%" Height="100%"
        Loaded="PageLoaded">
```

When <Path > tag is used for example, the parser uses the schema to look up the relevant namespace (for example, System.Windows.Shapes) to resolve and build the object.

In general, an element is an object in the element layer that participates in the property system, eventing and layout/presentation system. The parser finds tags and decides if those tags help to define an element or a resource object. In the special case of a VisualBrush, the same tags may be interpreted as elements or also interpreted as resource objects, depending on the context of where those tags appear, e.g., depending on whether appearing in complex property syntax or not.

In accordance with one aspect of the present invention, the markup language provides distinct ways to describe a resource, including a simple string format or a complex object notation. For a simple string format, the parser/translator 2304 uses a type converter 2308 for converting a string to an appropriate visual API object. By way of example, in the following line of markup, the Fill property value can be converted to a brush object, via the type converter 2308:

```
<Circle CenterX="10" CenterY="10" Radius="5" Fill="Red" />
```

As can be readily appreciated, the conversion of such an inline line of tag-based markup with simple strings of parameters is to a brush object is straightforward, and provides a simple way for a scene designer to add a shape and its attributes to a scene.

However there are times when the fill attribute is too complex to fit into a single string. In such a situation, complex property syntax, which may be inline in the markup, is used to set this property. For example, the following complex property syntax fills a circle with a gradient rather than a solid color, specifying the colors at various gradient stops (which can range from 0 to 1):

```
<Circle CenterX="10" CenterY="10" Radius="5">
    <Circle.Fill>
        <LinearGradient>
            <GradientStop Color="Red" Offset="0"/>
            <GradientStop Color="Blue" Offset="0.33"/>
            <GradientStop Color="Green" Offset="0.66"/>
            <GradientStop Color="Red" Offset="1.0"/>
        </LinearGradient>
    </Circle.Fill>
</Circle>
```

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax.

The parser handles markup in the complex property syntax by accessing the type converter 2308 as necessary, and also matching specified parameters to the object properties, thereby handling the complexity for the scene designer. Thus, the parser does not just set up the objects, but also sets attributes on the objects. Note that the parser actually instantiates a builder to create the objects, since objects are immutable.

Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 23, another such programming language 2310 can add elements to the element tree 208, or can directly interface with the visual API layer 212.

As also represented in FIG. 23 and in accordance with an aspect of the present invention, the same markup 2302 may be used to program at an element level and a resource level. As described above, the element level gives the scene designer full programmability, usage of the property system that provides inheritance (e.g., style-sheet like features), and eventing (e.g., whereby an element may have attached code to change its appearance, position and so forth in response to a user input event). However, the present invention also provides a resource-level mechanism by which scene designers can essentially shortcut the element tree and layout system and program directly to the visual API layer. For many types of static shapes, images and the like where element-level features are not needed, this provides a more efficient and lightweight way to output the appropriate object. To this end, the parser recognizes when a fill of type "visual brush" is present, and directly calls the API layer 212 with resource level data 2312 to create the object. In other words, as represented in FIG. 22, element level vector graphics get parsed into created elements, which need later translation to the objects, while resource level vector graphics get parsed and directly stored in an efficient manner.

By way of example, the following markup is directly derived from the object model for the LinearGradient object, and fills an outer circle with a VisualBrush. The contents of that VisualBrush are defined by the inner markup. Note that this syntax is commonly used for expressing various brushes, transforms and animations:

```
<Circle CenterX="10" CenterY="10" Radius="5">
    <Circle.Fill>
        <VisualBrush xmlns="...">
            <Circle CenterX="0.5" CenterY="0.5" Radius="0.25"
                Fill="Blue"/>
            <Circle CenterX="0.6" CenterY="0.6" Radius="0.25"
                Fill="Green"/>
            <Circle CenterX="0.7" CenterY="0.7" Radius="0.25"
                Fill="Red"/>
            <Circle CenterX="0.8" CenterY="0.8" Radius="0.25"
                Fill="LemonChiffon"/>
        </VisualBrush>
    </Circle.Fill>
</Circle>
```

Note that while these visual brush-filled objects are efficiently stored, the resource level data (or the objects created thereby) can be referenced by elements and part of the element tree 208, as generally represented in FIG. 23. To this end, these visual brush resources may be named (e.g., with a name, reference or other suitable identifier) and referenced like other resources described via the complex property syntax.

Turning to an explanation of the canvas, as mentioned above in one alternative implementation, shapes may be kept lightweight and thus may be required to be contained in a canvas. In this alternative implementation, when content is rendered, it is rendered onto an infinite, device-independent canvas which has an associated coordinate system. The canvas element may thus position content according to absolute coordinates. The canvas element can optionally define a viewport, which specifies clipping, a transform, a preferred aspect ratio and a way of mapping the viewport into a parent space. If there is no viewport established, the canvas element only specifies a grouping of drawing primitives and can set up a transform, opacity and other compositing attributes.

The following is a markup example for a sample canvas:

```
<Canvas Background="black" Top="100" Left="100"Height="600"
Width="800">
    <Rectangle Top="600" Left="100" Width="100" Height="50"
    Fill="red"
Stroke="blue" StrokeWidth="10"/>
    <Line x1="100" y1="300" x2="300" y2="100" Stroke="green"
    StrokeWidth="5"
/>
</Canvas>
```

Note that in one implementation, when coordinates are specified without units then they are considered as "logical pixels" of 96ths of an inch, and in the above example, the line will be 200 pixels long. In addition to coordinates, other properties include width, height horizontal and vertical alignment, and ViewBox (of type rect; default is unset or (0,0,0,0), meaning no adjustment is made, and the stretch and align properties get ignored). As generally described above with reference to FIGS. 18-20, other properties include stretch, which when not specified preserves original size, or can 1) specify a fill in which the aspect ratio is not preserved and the content is scaled to fill the bounds established by the top/left/width/height, 2) specify uniform, which scales size uniformly until the image fits the bounds established by the top/left/width/height, or 3) specify UniformToFill, which scales size uniformly to fill the bounds established by top/left/width/height, and clips as necessary.

To further correlate with the lower-level object model, the transform property establishes a new coordinate frame for the children of the element, while the clip property restricts the region to which content can be drawn on the canvas, with the default clipping path defined as the bounding box. The ZIndex property can be used to specify rendering order for nested canvas elements within a panel.

The Viewbox specifies a new coordinate system for the contents, e.g., by redefining the extent and origin of the viewport. Stretch helps to specify how those contents map into the viewport. The value of the viewBox attribute is a list of four "unitless" numbers <min-x>, <min-y>, <width>and <height>, e.g., separated by whitespace and/or a comma, and is of type Rect. The Viewbox rect specifies the rectangle in user space that maps to the bounding box. It works the same as inserting a scalex and scaley. The stretch property (in case the option is other than none) provides additional control for preserving the aspect ratio of the graphics. An additional transformation is applied to descendants of the given element to achieve the specified effect.

In the example above, the effective result of the rectangle in the markup sample above under each stretch rule would be:

```
None - from (100, 600) to (200, 650)
Fill - from (100, 100) to (900, 700)
Uniform - from (100, ?) to (900, ?) - the new height will be
400, and it will centered based on HorizontalAlign and
VerticalAlign.
UniformToFill - from (?, 100) to (?, 700) The new width is
1200, and will again be centered based on HorizontalAlign and
VerticalAlign.
```

If there is a transform on the canvas, it is essentially applied above (e.g., in the tree) the mapping to ViewBox. Note that this mapping will stretch any of the elements in a canvas, e.g., boxes, text, and so forth, not just shapes. Further, note that if a viewbox is specified, the canvas no longer sizes to its contents, but rather has a specified size. If y-width and y-height are also specified, then the stretch/align properties are used to fit the viewbox into the specified width and height.

The elements in the object model can each have a 'Clip' attribute applied. On some elements, notably shapes, this is exposed directly as a common language runtime property, while on others (e.g., most controls) this property is set via a DynamicProperty.

Figure 24:
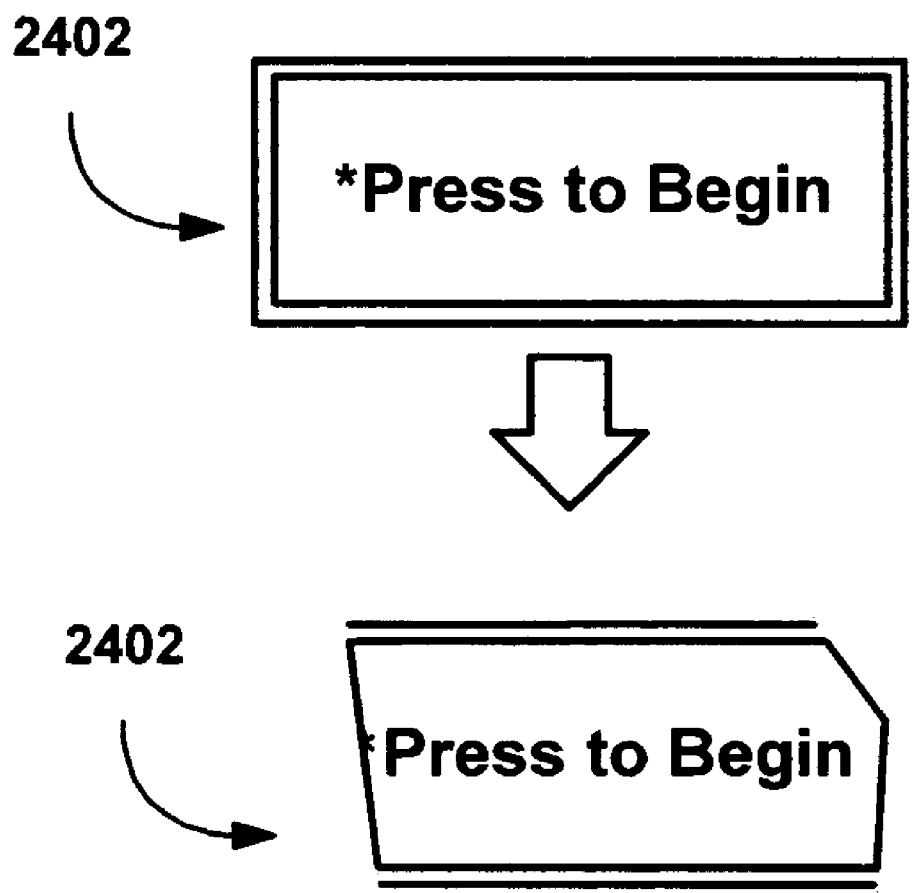
FIG. 24 is a representation of clipping via a geometry path in accordance with an aspect of the present invention.

In general, the clipping path restricts the region to which content can be drawn, as generally represented in FIG. 24 wherein a button is shown in an unclipped form 2402 and a form 2404 in which a clipping path is specified (where the dashed line represents the clipping path). Conceptually, any parts of the drawing that lie outside of the region bounded by the currently active clipping path are not drawn. A clipping path can be thought of as a mask wherein those pixels outside the clipping path are black with an alpha value of zero and those pixels inside the clipping path are white with an alpha value of one (with the possible exception of anti-aliasing along the edge of the silhouette).

A clipping path is defined by a Geometry object, either inline or more typically in a resource section. A clipping path is used and/or referenced using the "Clip" property on an element, as shown in the following example:

```
<def:Resources>
    <Geometry def:ID="MyClip">
        <Path Data="..." />
        <Rectangle ... />
    </Geometry>
</def:Resources>
    <Element Clip=""%resource; MyClip"   ... />
```

Note that animating a Clip is similar to animating transforms:

```
<Element>
    <Element.Clip>
        <Circle ..../>
        <Rectangle .... >
            <FloatAnimation ... />
        </Rectangle>
    </Element.Clip>
    ... children ...
</Element>
```

A path is drawn by specifying the 'Geometry' data and the rendering properties, such as Fill, Stroke, and StrokeWidth on the Path element. An example markup for a path is specified as follows:

```
<Path Data="M 100 100 L 300 100 L 200 300 z"
    Fill="red" Stroke="blue" StrokeWidth="3" />
```

The path 'Data' string is of type Geometry. A more verbose and complete way to specify a drawn path is via the complex property syntax, as described above. The markup (such as in the following example) is fed directly into the Geometry builder classes described above:

```
<Path>
    <Path.Data>
        <CircleGeometry ... />
        <RectangleGeometry ... />
        <PathGeometry ... />
    </Path.Data>
    <Path.Fill value="red" />
    <Path.Stroke value="blue"/>
</Path>
```

The path data string is also described, using the following notation to describe the grammar for a path data string:

```
*: 0 or more
+: 1 or more
?: 0 or 1
( ): grouping
|: separates alternatives
double quotes surround literals
```

The following shows the path data string information described with this notation (note that in one implementation, FillMode may be specified here, instead of a property at the element level):

```
wvg-path:
    wsp* moveto-drawto-command-groups? wsp*
moveto-drawto-command-groups:
    moveto-drawto-command-group
    | moveto-drawto-command-group wsp* moveto-drawto-command-
groups
moveto-drawto-command-group:
    moveto wsp* drawto-commands?
drawto-commands:
    drawto-command
    | drawto-command wsp* drawto-commands
drawto-command:
    closepath
    | lineto
    | horizontal-lineto
    | vertical-lineto
    | curveto
    | smooth-curveto
    | quadratic-bezier-curveto
    | smooth-quadratic-bezier-curveto
    | elliptical-arc
moveto:
    ( "M" | "m" ) wsp* moveto-argument-sequence
moveto-argument-sequence:
    coordinate-pair
    | coordinate-pair comma-wsp? lineto-argument-sequence
closepath:
    ("Z" | "z")
lineto:
    ( "L" | "l" ) wsp* lineto-argument-sequence
lineto-argument-sequence:
    coordinate-pair
    | coordinate-pair comma-wsp? lineto-argument-sequence
horizontal-lineto:
    ( "H" | "h" ) wsp* horizontal-lineto-argument-sequence
horizontal-lineto-argument-sequence:
    coordinate
    | coordinate comma-wsp? horizontal-lineto-argument-
sequence
vertical-lineto:
    ( "V" | "v" ) wsp* vertical-lineto-argument-sequence
vertical-lineto-argument-sequence:
    coordinate
    | coordinate comma-wsp? vertical-lineto-argument-sequence
curveto:
    ( "C" | "c" ) wsp* curveto-argument-sequence
curveto-argument-sequence:
    curveto-argument
    | curveto-argument comma-wsp? curveto-argument-sequence
curveto-argument:
    coordinate-pair comma-wsp? coordinate-pair comma-wsp?
coordinate-pair
smooth-curveto:
    ( "S" | "s" ) wsp* smooth-curveto-argument-sequence
smooth-curveto-argument-sequence:
    smooth-curveto-argument
    | smooth-curveto-argument comma-wsp? smooth-curveto-
argument-sequence
smooth-curveto-argument:
    coordinate-pair comma-wsp? coordinate-pair
quadratic-bezier-curveto:
    ( "Q" | "q" ) wsp* quadratic-bezier-curveto-argument-
sequence
quadratic-bezier-curveto-argument-sequence:
    quadratic-bezier-curveto-argument
    | quadratic-bezier-curveto-argument comma-wsp?
        quadratic-bezier-curveto-argument-sequence
quadratic-bezier-curveto-argument:
    coordinate-pair comma-wsp? coordinate-pair
smooth-quadratic-bezier-curveto:
    ( "T" | "t" ) wsp* smooth-quadratic-bezier-curveto-
argument-sequence
smooth-quadratic-bezier-curveto-argument-sequence:
    coordinate-pair
    | coordinate-pair comma-wsp? smooth-quadratic-bezier-
curveto-argument-sequence
elliptical-arc:
    ( "A" | "a" ) wsp* elliptical-arc-argument-sequence
elliptical-arc-argument-sequence:
    elliptical-arc-argument
    | elliptical-arc-argument comma-wsp? elliptical-arc-
argument-sequence
elliptical-arc-argument:
    nonnegative-number comma-wsp? nonnegative-number comma-
wsp?
        number comma-wsp flag comma-wsp flag comma-wsp
    coordinate-pair
coordinate-pair:
    coordinate comma-wsp? coordinate
coordinate:
    number
nonnegative-number:
    integer-constant
    | floating-point-constant
number:
    sign? integer-constant
    | sign? floating-point-constant
flag:
    "0" | "1"
comma-wsp:
    (wsp+ comma? wsp*) | (comma wsp*)
comma:
    ","
integer-constant:
    digit-sequence
```

-continued

```
floating-point-constant:
    fractional-constant exponent?
    | digit-sequence exponent
fractional-constant:
    digit-sequence? "." digit-sequence
    | digit-sequence "."
exponent:
    ( "e" | "E" ) sign? digit-sequence
sign:
    "+" | "-"
digit-sequence:
    digit
    | digit digit-sequence
``` the current user coordinate system. The image (indicated by the image tag) can refer to raster image files such as PNG or JPEG, or to files with MIME type of "image/wvg", as set forth in the following example:

```
<Image Top="200" Left="200" Width="100px" Height="100px"
Source ="myimage.png">
</Image>
```

The following table provides information on some example properties for images:

| Name | Type | R/RW | Default Value | Description |
|---|---|---|---|---|
| Top | BoxUnit | | | Coordinate for the top side of the Image |
| Left | BoxUnit | | | Coordinate for the left side of the Image |
| Width | BoxUnit | | | Width of the Image |
| Height | BoxUnit | | | Height of the Image |
| Source | ImageData | | | Source of the Image |
| Dpi | Float | | 96(?) | Target DPI to use for sizing |
| HorizontalAlign | enum { Left (?), Center (?), Right (?) } | | Center | |
| VerticalAlign | enum { Top (?), Middle (?), Bottom (?) } | | Middle | |
| Stretch | enum Stretch { None, Fill, Uniform, UniformToFill } | | None | None: Preserve original size Fill: Aspect ratio is not preserved and the content is scaled to fill the bounds established by tlbh Uniform Scale size uniformly until the image fits the bounds established by the tlwh. UniformToFill: Scale size uniformly to fill the bounds established by tlbh, and clipped. |
| ReadyState | enum { MetaDataReady, Loading, Loaded, LoadError } | | | |
| LoadCounter | Int | Read | Null | Counter that increments when ReadyState is Loading |
| Name | String | | | Alternate text for the Image. |

-continued

```
digit:
    "0" | "1" | "2" | "3" | "4" | "5" | "6" | "7" | "8" | "9"
wsp:
    (#x20 | #x9 | #xD | #xA)
```

The image element (FIG. 25) indicates that the contents of a complete file are to be rendered into a given rectangle within As described above, shapes correspond to geometry drawn with inherited and cascaded presentation properties. The following tables set forth example shape properties for the basic shape elements described above (Rectangle, Ellipse, Line, Polyline, Polygon). Note that these basic shapes may have stroke properties, fill properties, and used as clip paths, have inheritance characteristics, and apply to both the element and Resource levels:

| Name | Type | R/RW | Default Value | Description |
|---|---|---|---|---|
| Fill | Brush | RW | null | Coordinate for the top side of the rect |
| FillOpacity | Float | RW | 1.0 | Coordinate for the left side of the rect |
| Stroke | Brush | RW | null | Width of the rect |
| StrokeOpacity | Float | RW | 1.0 | Height of the rect |
| StrokeWidth | BoxUnit | RW | 1px | Width of the stroke. 1px = 1/96 of an inch |
| FillRule | enum { EvenOdd, NonZero } | RW | EvenOdd | FillRule indicates the algorithm which is to be used to determine what parts of the canvas are included inside the shape. |
| StrokeLineCap | enum { Butt, Round, Square, Diamond } | RW | Butt | StrokeLineCap specifies the shape to be used at the end of open subpaths when they are stroked. |
| StrokeLineJoint | enum { Miter, Round, Bevel } | RW | Miter | StrokeLineJoin specifies the shape to be used at the corners of paths (or other vector shapes) that are stroked when they are stroked. |
| StrokeMiterLimit | Float | RW | 4.0 | The limit on the ratio of the MiterLength to the StrokeWidth. Value to be >= 1 |
| StrokeDashArray | PointList | RW | null | StrokeDashArray controls the pattern of dashes and gaps used to stroke paths. <dasharray> contains a list of space- or comma-separated <number>s that specify the lengths of alternating dashes and gaps in user units. If an odd number of values is provided, then the list of values is repeated to yield an even number of values. Thus, stroke-dasharray: 5 3 2 is equivalent to stroke-dasharray: 5 3 2 5 3 2. |
| StrokeDashOffset | Point | RW | | StrokeDashoffset specifies the distance into the dash pattern to start the dash. |
| Transform | Transform | RW | null | Transform establishes a new coordinate frame for the children of the element |
| Clip | Geometry | RW | null | Clip restricts the region to which paint can be applied on the canvas. The default clipping path is defined as the bounding box. |

The following is an example markup syntax for a rectangle:

```
<Rectangle Top="600" Left="100" Width="100" Height="50"
Fill="red" Stroke="blue" StrokeWidth="10"/>
```

A rectangle has the following properties in the object model (note that rectangles are read/write, have default values equal to zero, support inheritance and apply to both the element and Resource levels):

| Name | Type | Description |
|---|---|---|
| Top | BoxUnit | Coordinate for the top side of the rect |
| Left | BoxUnit | Coordinate for the left side of the rect |
| Width | BoxUnit | Width of the rect |
| Height | BoxUnit | Height of the rect |
| RadiusX | BoxUnit | For rounded rectangles, the X-axis radius of the ellipse used to round off the corners of the rectangle. If a negative X-axis radius is specified, the absolute value of the radius will be used. |
| RadiusY | BoxUnit | For rounded rectangles, the Y-axis radius of the ellipse used to round off the corners of the rectangle. If a negative X-axis radius is specified, the absolute value of the radius will be used. |

The following is an example markup syntax for a circle:

```
<Circle CenterX="600" CenterY="100" Fill="red"
Stroke="blue" StrokeWidth="10"/>
```

A circle has the following properties in the object model (note that circles are read/write, have default values equal to zero, support inheritance and apply to both the element and Resource levels):

| Name | Type | Description |
|---|---|---|
| CenterX | BoxUnit | X coordinate of the center of the circle |
| CenterY | BoxUnit | X coordinate of the center of the circle |
| Radius | BoxUnit | Radius of the circle |

The following is an example markup syntax for an ellipse:

```
<Ellipse CenterX="600" CenterY="100" Fill="red"
Stroke="blue" StrokeWidth="10"/>
```

An ellipse has the following properties in the object model (note that ellipses are read/write, have default values equal to zero, support inheritance and apply to both the element and Resource levels):

| Name | Type | Description |
|---|---|---|
| CenterX | Coordinate | X coordinate of the center of the ellipse |
| CenterY | Coordinate | X coordinate of the center of the ellipse |
| RadiusX | Length | The X-axis radius of the ellipse. If a negative X-axis radius is specified, the absolute value of the radius will be used. |
| RadiusY | Length | The Y-axis radius of the ellipse. If a negative Y-axis radius is specified, the absolute value of the radius will be used. |

The following is an example markup syntax for a line:

```
<Line x1="100" y1="300" x2="300" y2="100"
StrokeWidth="5" />
```

A line has the following properties in the object model (note that lines are read/write, have default values equal to zero, support inheritance and apply to both the element and Resource levels):

| Name | Type | Description |
|---|---|---|
| X1 | BoxUnit | The X-axis coordinate of the start of the line. The default value is "0". |
| Y1 | BoxUnit | The Y-axis coordinate of the start of the line. The default value is "0". |
| X2 | BoxUnit | The X-axis coordinate of the end of the line. The default value is "0". |
| Y2 | BoxUnit | The Y-axis coordinate of the end of the line. The default value is "0". |

The 'Polyline' defines a set of connected straight line segments. Typically, a 'Polyline' defines an open shape.

The following is an example markup syntax for a polyline:

```
<Polyline Fill="None" Stroke="Blue" StrokeWidth="10cm"
Points="50,375
150,375 150,325 250,325 250,375
350,375 350,250 450,250 450,375
550,375 550,175 650,175 650,375
750,375 750,100 850,100 850,375
950,375 950,25 1050,25 1050,375
1150,375" />
```

A polyline has the following properties in the object model (note that lines are read/write, have default values equal to null, support inheritance and apply to both the element and Resource levels):

| Name | Type | Description |
|---|---|---|
| Points | PointCollection | The points that make up the Polyline. Coordinate values are in the user coordinate system. |

The Polygon element defines a closed shape comprising a set of connected straight line segments. The following is an example markup syntax for a polygon:

```
<Polygon Fill="red" Stroke="blue" StrokeWidth="10"
points="350,75 379,161 469,161 397,215
423,301 350,250 277,301 303,215
231,161 321,161" />
```

A polygon has the following properties in the object model (note that lines are read/write, have default values equal to null, support inheritance and apply to both the element and Resource levels):

| Name | Type | Description |
|---|---|---|
| Points | PointCollection | The points that make up the Polygon. Coordinate values are in the user coordinate system. If an odd number of coordinates are provided, then the element is in error. |

The grammar for points specifications in 'polyline' and 'polygon' elements is described with the following notation:

```
*: 0 or more
+: 1 or more
?: 0 or 1
( ): grouping
|: separates alternatives
double quotes surround literals
```

The following describes the points specifications in 'Polyline' and 'Polygon' elements using the above notation:

```
list-of-points:
    wsp* coordinate-pairs? wsp*
coordinate-pairs:
    coordinate-pair
    | coordinate-pair comma-wsp coordinate-pairs
coordinate-pair:
    coordinate comma-wsp coordinate
```

-continued

```
coordinate:
    number
number:
    sign? integer-constant
    | sign? floating-point-constant
comma-wsp:
    (wsp+ comma? wsp*) | (comma wsp*)
comma:
    ","
integer-constant:
    digit-sequence
floating-point-constant:
    fractional-constant exponent?
    | digit-sequence exponent
fractional-constant:
    digit-sequence? "." digit-sequence
    | digit-sequence "."
exponent:
    ( "e" | "E" ) sign? digit-sequence
sign:
    "+" | "–"
digit-sequence:
    digit
    | digit digit-sequence
digit:
    "0" | "1" | "2" | "3" | "4" | "5" | "6" | "7" | "8" | "9"
wsp:
    (#x20 | #x9 | #xD | #xA)+
```

CONCLUSION

As can be seen from the foregoing detailed description, there is provided a system, method and element/object model that provide program code various mechanisms to interface with a scene graph. The system, method and object model are straightforward to use, yet powerful, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method for composing vector graphics, the method comprising:
    an application programming interface (API) receiving a plurality of function calls for composing vector graphics,
        the function calls comprising calls defined by a markup language and an object model,
        the markup language providing a string format and an object notation for describing a resource, and the markup language comprising an element class, the element class comprising a shape class, an image class, a video class, and a canvas class, and
    the object model comprising
        a base visual object which is a container for graphical content,
        a container visual object which is a visual object that does not directly contain graphical content but contains one or more child drawing visual objects, and
        drawing visual objects which are visual objects that can contain graphical content and which comprise child objects which are organized in a zero-based, z-order space;
    a parser/translator
        a) interpreting each of string format calls and object notation calls within the markup language,
        b) accessing a type converter, the type converter configured to convert string format calls to visual API objects,
        c) adding elements to an element tree within an element and layout system, and
        d) communicating resource-level data to a visual API;
    an element and layout system translating data comprising an element tree into calls to the visual API;
    the visual API
        a) accepting input from the parser translator, from the element and layout system, and directly from non-markup programming languages,
        b) interfacing with a scene graph,
        c) being configured to create scene graph objects, and
        d) providing access to a compositing and animation engine;
    a compositing and animation engine interfacing with the visual API, and the compositing and animation engine managing the composing, animating, and rendering of the scene graph; and
    causing a change in a graphics display in response to the modification of data in the scene graph.

2. The method of claim 1 wherein causing data in the scene graph to be modified comprises causing initialization of a new instance of a visual class.

3. The method of claim 2 wherein causing data in the scene graph to be modified comprises invoking code to associate a transform with a visual object in the scene graph.

4. The method of claim 1 wherein causing data in a scene graph data structure to be modified comprises invoking code to place a drawing visual into the scene graph.

5. The method of claim 4 further comprising, causing a drawing context to be returned, the drawing context providing a mechanism for rendering into the drawing visual.

6. The method of claim 2 wherein causing data in the scene graph to be modified comprises invoking code to associate brush data with a visual object in the scene graph.

7. The method of claim 6 wherein the brush data comprises receiving data corresponding to a solid color.

8. The method of claim 6 wherein receiving brush data comprises receiving data corresponding to a linear gradient brush and a stop collection comprising at least one stop.

9. The method of claim 6 wherein receiving brush data comprises receiving data corresponding to a radial gradient brush.

10. The method of claim 6 wherein receiving brush data comprises receiving data corresponding to an image.

11. The method of claim 10 further comprising, receiving markup corresponding to an image effect to apply to the image.

12. The method of claim 1 further comprising, receiving markup corresponding to pen data that defines an outline of a shape.

13. The method of claim 1 wherein the markup corresponds to a shape class comprising at least one of the set containing rectangle, polyline, polygon, path, line and ellipse shapes.

14. The method of claim 1 wherein causing data in the scene graph to be modified comprises invoking a geometry-related function to represent a rectangle in the scene graph data structure.

15. The method of claim 1 wherein causing data in the scene graph to be modified comprises invoking a geometry-related function to represent a path in the scene graph data structure.

16. The method of claim 1 wherein causing data in the scene graph to be modified comprises invoking a geometry-related function to represent a line in the scene graph data structure.

17. The method of claim 1 wherein the markup is related to hit-testing a visual in the scene graph data structure.

18. The method of claim 1 wherein causing data in a scene graph data structure to be modified comprises invoking a function related to transforming coordinates of a visual in the scene graph data structure.

19. The method of claim 1 wherein the markup is related to calculating a bounding box of a visual in the scene graph data structure.

20. The method of claim 1 wherein causing data in the scene graph to be modified comprises invoking a function via a common application programming interface to a visual object in the scene graph data structure.

21. The method of claim 1 further comprising invoking a visual manager to render a tree of at least one visual object to a rendering target.

22. The method of claim 1 wherein causing data in the scene graph to be modified comprises invoking a function to place a container object in the scene graph data structure, the container object configured to contain at least one visual object.

23. The method of claim 1 wherein causing data in the scene graph to be modified comprises invoking a function to place image data into the scene graph data structure.

24. The method of claim 23 wherein causing data in the scene graph to be modified comprises invoking a function to place an image effect object into the scene graph data structure that is associated with the image data.

25. The method of claim 1 wherein causing data in the scene graph to be modified comprises invoking a function to place data corresponding to text into the scene graph data structure.

26. The method of claim 1 wherein causing data in the scene graph to be modified comprises invoking a function to provide a drawing context in response to the function call.

27. The method of claim 26 wherein the function call corresponds to a retained visual, and further comprising, calling back to have the drawing context of the retained visual returned to the scene graph data structure.

28. The method of claim 1 wherein causing data in the scene graph to be modified comprises invoking a function to place a three-dimensional visual into the scene graph data structure.

29. The method of claim 28 wherein causing data in the scene graph to be modified comprises mapping a two-dimensional surface onto the three-dimensional visual.

30. The method of claim 1 wherein causing data in the scene graph to be modified comprises invoking a function to place animation data into the scene graph data structure.

31. The method of claim 30 further comprising communicating timeline information corresponding to the animation data to a composition engine.

32. The method of claim 31 wherein the composition engine interpolates graphics data based on the timeline to animate an output corresponding to an object in the scene graph data structure.

33. The method of claim 32 wherein the composition engine is at a low-level with respect to the scene graph.

34. The method of claim 1 wherein causing data in the scene graph to be modified comprises invoking a function to place an object corresponding to audio and/or video data into the scene graph data structure.

35. The method of claim 1 wherein causing data in the scene graph to be modified comprises changing a mutable value of an object in the scene graph data structure.

* * * * *